United States Patent
Zhang et al.

(10) Patent No.: US 12,465,226 B2
(45) Date of Patent: Nov. 11, 2025

(54) VITAL SIGN DETECTION METHOD AND ELECTRONIC DEVICE

(71) Applicant: Honor Device Co., Ltd., Shenzhen (CN)

(72) Inventors: Xiaowu Zhang, Shenzhen (CN); Danhong Li, Shenzhen (CN); Haoxuan Di, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/007,109

(22) PCT Filed: Sep. 8, 2022

(86) PCT No.: PCT/CN2022/117950
§ 371 (c)(1),
(2) Date: Jan. 27, 2023

(87) PCT Pub. No.: WO2023/071550
PCT Pub. Date: May 4, 2023

(65) Prior Publication Data
US 2024/0245314 A1    Jul. 25, 2024

(30) Foreign Application Priority Data

Nov. 1, 2021   (CN) .......................... 202111285028.0
Dec. 30, 2021  (CN) .......................... 202111669683.6

(51) Int. Cl.
*A61B 5/00*    (2006.01)
*A61B 5/024*   (2006.01)

(52) U.S. Cl.
CPC .......... *A61B 5/02416* (2013.01); *A61B 5/721* (2013.01); *A61B 5/7257* (2013.01);
(Continued)

(58) Field of Classification Search
CPC ...... A61B 2562/0219; A61B 2562/185; A61B 5/02416; A61B 5/681; A61B 5/721; A61B 5/7257; A61B 5/7264
See application file for complete search history.

(56) References Cited

U.S. PATENT DOCUMENTS 10,398,381 B1   9/2019  Heneghan et al.
10,799,127 B2   10/2020 Wei et al.
(Continued)

FOREIGN PATENT DOCUMENTS

CN   103970271 A   8/2014
CN   104207756 A   12/2014
(Continued)

OTHER PUBLICATIONS

Schack, T. "Computationally Efficient Heart Rate Estimation During Physical Exercise Using Photoplethysmographic Signals", 2017 25th European Signal Processing Conference (EUSIPCO), 2547-2550. (Year: 2017).*

(Continued)

*Primary Examiner* — Keith M Raymond
*Assistant Examiner* — Milton Truong
(74) *Attorney, Agent, or Firm* — Slater Matsil, LLP

(57) ABSTRACT

This application discloses a vital sign detection method and an electronic device. The method includes: obtaining an acceleration signal and PPG signals of a plurality of channels within a preset time period; calculating, in a case that there is at least one correlation coefficient in the correlation coefficient matrix less than or equal to a first threshold, a variance of the PPG signals of each channel in the plurality of channels; performing frequency domain fusion after performing a FFT on the PPG signals of the plurality of channels, to obtain a frequency domain signal of the fused PPG signal; performing the FFT on the acceleration signal (Continued)

to obtain a frequency domain signal of the acceleration signal; inputting the frequency domain signal of the fused PPG signal and the frequency domain signal of the acceleration signal into a deep neural network to obtain a value of a vital sign.

20 Claims, 15 Drawing Sheets

(52) U.S. Cl.
CPC ............ *A61B 5/7264* (2013.01); *A61B 5/742* (2013.01); *A61B 2562/0219* (2013.01)

(56) References Cited

U.S. PATENT DOCUMENTS

| | | | |
|---|---|---|---|
| 11,419,511 | B2 | 8/2022 | Huijbregts et al. |
| 2016/0038045 | A1* | 2/2016 | Shapiro .............. A61B 5/02416 600/479 |
| 2016/0198964 | A1 | 7/2016 | Lee et al. |
| 2017/0164847 | A1 | 6/2017 | Pande et al. |
| 2019/0357850 | A1 | 11/2019 | Li et al. |
| 2021/0106241 | A1 | 4/2021 | Kerman et al. |
| 2022/0133241 | A1* | 5/2022 | Jones ................... A61B 5/1032 600/485 |

FOREIGN PATENT DOCUMENTS

| | | |
|---|---|---|
| CN | 105877766 A | 8/2016 |
| CN | 106264505 A | 1/2017 |
| CN | 107847158 A | 3/2018 |
| CN | 109222949 A | 1/2019 |
| CN | 209014928 U | 6/2019 |
| CN | 110664390 A | 1/2020 |
| CN | 111166306 A | 5/2020 |
| CN | 111243739 A | 6/2020 |
| CN | 111481190 A | 8/2020 |
| CN | 111629666 A | 9/2020 |
| CN | 111839490 A | 10/2020 |
| CN | 113349752 A | 9/2021 |
| CN | 113420624 A | 9/2021 |
| WO | 2021160189 A1 | 8/2021 |

OTHER PUBLICATIONS

H. Chung et al: "Feasibility Study of Deep Neural Network for Heart Rate Estimation from Wearable Photoplethysmography and Acceleration Signals," 2019 41st Annual International Conference of the IEEE, 4 pages. Engineering in Medicine and Biology Society (EMBC), Berlin, Germany, Jul. 23-27, 2019, 4 pages.

T. Schäck et al: "Computationally efficient heart rate estimation during physical exercise using photoplethysmographic signals," 2017 25th European Signal Processing Conference (EUSIPCO), Kos, Greece, Aug. 28-Sep. 2, 2017, 4 pages.

P. Mehrgardt, M. Khushi, S. Poon and A. Withana, "Deep Learning Fused Wearable Pressure and PPG Data for Accurate Heart Rate Monitoring," in IEEE Sensors Journal, vol. 21, No. 23, Dec. 1, 2021, 10 pages.

H. Chung et al: "Deep Learning for Heart Rate Estimation From Reflectance Photoplethysmography With Acceleration Power Spectrum and Acceleration Intensity," in IEEE Access, vol. 8, Apr. 15, 2020, 13 pages.

\* cited by examiner

|   | 1   | 2   | 3   | 4   |
|---|-----|-----|-----|-----|
| 1 | 1   | 0.8 | 0.9 | 0.4 |
| 2 | 0.8 | 1   | 0.6 | 0.5 |
| 3 | 0.9 | 0.6 | 1   | 0.8 |
| 4 | 0.4 | 0.5 | 0.8 | 1   |

VITAL SIGN DETECTION METHOD AND ELECTRONIC DEVICE

CROSS-REFERENCE TO RELATED APPLICATIONS

This application is a national stage of International Application No. PCT/CN2022/117950, filed on Sep. 8, 2022, which claims priority to Chinese Patent Application No. 202111285028.0, filed on Nov. 1, 2021, and Chinese Patent Application No. 202111669683.6, filed on Dec. 30, 2021. The disclosures of each of the aforementioned applications are hereby incorporated by reference in their entireties.

TECHNICAL FIELD

This application relates to the field of intelligent terminals, and in particular, to a vital sign detection method and an electronic device.

BACKGROUND

An electronic device supporting heart rate detection can detect heart rate based on a photoplethysmographic (photoplethysmographic, PPG) signal. A basic principle of detecting heart rate based on the PPG signal is as follows: A light-emitting diode (light-emitting diode, LED) illuminates skin tissue, and light reflected back through the skin tissue is received by a photo diode (photo diode, PD) and converted into a PPG signal. The absorption of light by human tissue such as muscles, bones, and veins is basically unchanged, but a periodic change of blood flow in arteries may cause a periodic change in the PPG signal, so the heart rate can be detected based on the PPG signal.

However, the PPG signal is greatly affected by noise interference, which causes the distortion of the PPG signal, and then seriously affects the accuracy of the heart rate detection.

SUMMARY

Embodiments of this application provide a vital sign detection method and an electronic device, to improve the accuracy of vital sign detection.

To achieve the foregoing objective, the following technical solutions are used in the embodiments of this application:

According to a first aspect, a vital sign detection method is provided, including: obtaining an acceleration signal and photoplethysmographic PPG signals of a plurality of channels within a preset time period; calculating a correlation coefficient matrix among the photoplethysmographic PPG signals of the plurality of channels; calculating, in a case that there is at least one correlation coefficient in the correlation coefficient matrix less than or equal to a first threshold, a variance of the PPG signals of each channel in the plurality of channels; performing, in a case that variances of PPG signals of all channels are greater than or equal to a second threshold, frequency domain fusion after performing a FFT on the PPG signals of the plurality of channels, to obtain a frequency domain signal of the fused PPG signal; performing the FFT on the acceleration signal to obtain a frequency domain signal of the acceleration signal; inputting the frequency domain signal of the fused PPG signal and the frequency domain signal of the acceleration signal into a deep neural network to obtain a value of a vital sign; and displaying the value of the vital sign.

In the vital sign detection method provided in the embodiments of this application, a correlation coefficient matrix among the photoplethysmographic PPG signals of the plurality of channels is calculated; in a case that there is at least one correlation coefficient in the correlation coefficient matrix less than or equal to a first threshold, that is, there is a relatively low correlation between PPG signals of at least two channels, a variance of the PPG signals of each channel in the plurality of channels is calculated; in a case that variances of the PPG signals of all channels are greater than or equal to a second threshold, that is, the PPG signals of all channels are greatly affected by the noise interference, frequency domain fusion is performed after performing a FFT on the PPG signals of the plurality of channels, to obtain a frequency domain signal of the fused PPG signal; a fast Fourier transformation is performed on the acceleration signal to obtain a frequency domain signal of the acceleration signal; the frequency domain signal of the fused PPG signal and the frequency domain signal of the acceleration signal are input into a deep sequence neural network to obtain a value of a vital sign; and the value of the vital sign is displayed. Interference in the PPG signal is filtered by using a strong anti-interference feature of the deep neural network, to improve the accuracy of vital sign detection.

In a possible implementation, the method further includes: adding, in a case that each correlation coefficient in the correlation coefficient matrix is greater than the first threshold, the PPG signals of the plurality of channels to a set; and performing time domain fusion on the PPG signals of the channels belonging to the set, and performing the fast Fourier transformation on the signal after the time domain fusion, to obtain the frequency domain signal of the fused PPG signal. In this way, that is, the correlation between PPG signals of any two channels is relatively high, the noise interference of the PPG signals is relatively small, and the calculation workload can be reduced without reducing the accuracy through the time domain fusion.

It should be noted that, performing time domain fusion on the PPG signals of a plurality of channels, or performing frequency domain fusion on the PPG signals of a plurality of channels, either of the two can be selected to be performed; or the two can be performed conditionally, that is, when a first condition is satisfied, time domain fusion is performed on the PPG signals of the plurality of channels, and when a second condition is satisfied, frequency domain fusion is performed on the plurality of channels. For example, when the noise interference in the PPG signals of the plurality of channels is relatively small (for example, less than a preset threshold, that is, the quality is better), the time domain fusion is performed on the PPG signals of the plurality of channels, and when the noise interference in the PPG signals of the plurality of channels is relatively large (for example, greater than the preset threshold, that is, the quality is poor), the frequency domain fusion is performed on the PPG signals of the plurality of channels.

In a possible implementation, the method further includes: calculating, in a case that a variance of the PPG signals of any channel is less than the second threshold, autocorrelation coefficients of the PPG signals of channels whose variances are less than the second threshold. The autocorrelation coefficient represents the correlation between the PPG signals of a same channel at different times (that is, a quality of a periodicity), that is, the autocorrelation coefficient represents the effect of a past PPG signal of the same channel on a present PPG signal. A better periodicity of the PPG signal indicates a larger autocorrelation coefficient, and a worse periodicity of the PPG signal indicates a smaller autocorrelation coefficient.

In a possible implementation, in a case that an autocorrelation coefficient of the PPG signals of any channel is greater than a third threshold, time domain fusion is performed on the PPG signals of the channels belonging to the set, and the fast Fourier transformation is performed on the signal after the time domain fusion, to obtain the frequency domain signal of the fused PPG signal. The better periodicity of the PPG signal indicates the larger autocorrelation coefficient, and noise interference of the PPG signal is relatively small, and calculation workload can be reduced without reducing the accuracy through the time domain fusion.

In a possible implementation, the method further includes: performing, in a case that autocorrelation coefficients of the PPG signals of all the channels are less than or equal to a third threshold, frequency domain fusion after performing the fast Fourier transformation on the PPG signals of the plurality of channels, to obtain the frequency domain signal of the fused PPG signal. The worse periodicity of the PPG signal indicates the smaller autocorrelation coefficient, and the accuracy can be improved through frequency domain fusion.

In a possible implementation, the performing time domain fusion on the PPG signals of the channels belonging to the set includes: averaging the PPG signals of the channels belonging to the set. The calculation workload can be reduced without reducing the accuracy through averaging.

In a possible implementation, the performing frequency domain fusion after performing a fast Fourier transformation on the PPG signals of the plurality of channels, to obtain a frequency domain signal of the fused PPG signal includes: obtaining a frequency domain measurement value corresponding to a value of a previous vital sign; performing the fast Fourier transformation on the PPG signals of the plurality of channels to obtain frequency domain signals of the PPG signals of the plurality of channels; obtaining a proximity peak in the frequency domain signals of the PPG signals for each channel, where the proximity peak refers to a peak value closest to the frequency domain measurement value in the frequency domain signals of the PPG signals of the each channel; and selecting a maximum value of the proximity peaks in the frequency domain signals of the PPG signals of the plurality of channels, and for remaining values in the frequency domain signals of the PPG signals of the plurality of channels, selecting a minimum value at a same moment, to obtain the frequency domain signal of the fused PPG signal.

By finding a proximity peak of the frequency domain measurement value corresponding to the value of the previous vital sign, a valid signal is filtered out. By determining the maximum value from the proximity peak, and then taking the minimum value of the remaining values, a maximum value of the valid signal is essentially selected, and other invalid signals (including noise interference) are suppressed, thereby improving a signal-to-noise ratio.

In a possible implementation, the method further includes: increasing a quantity of the channels in response to a first operation; or reducing the quantity of the channels in response to a second operation.

By increasing the quantity of the channels, that is, selecting PPG signals of more (for example, all) channels for performing the vital sign detection method, the accuracy is increased. By reducing the quantity of the channels, that is, selecting PPG signals of fewer channels for performing the vital sign detection method, data storage and calculation pressure is reduced, and then power consumption is reduced.

In a possible implementation, the vital sign is heart rate. The vital sign may further be blood oxygen saturation, or the like, which is not limited in this application.

In a possible implementation, the deep neural network is a deep sequence neural network, and the deep sequence neural network includes a recurrent network layer for accumulating a time sequence of inputted eigenvectors.

When interference suddenly occurs, the recurrent network layer can effectively filter out the interference and improve the robustness of the system.

According to a second aspect, an electronic device is provided, including: a processor, at least one light-emitting diode and a plurality of photo diodes; where the light-emitting diode is configured to emit light to human tissue; the plurality of photo diodes are configured to respectively receive the light reflected by the human tissue, and output photoplethysmographic PPG signals of a plurality of channels; and the processor is configured to perform the method according to the first aspect and any implementation thereof. For technical effects of the electronic device, reference may be made to technical effects of the first aspect and any implementation thereof.

In a possible implementation, a quantity of the photo diodes is 8. This application does not limit a quantity of the light-emitting diodes 1031. For example, there may be 2, 4 or any other number of the light-emitting diodes 1031. More light-emitting diodes 1031 indicate higher light intensity, and better anti-interference performance of ambient light.

In a possible implementation, a quantity of the light-emitting diodes is 2 This application does not limit a quantity of the photo diodes 1032. For example, there may be 2, 4, 8 or any other number of the photo diodes 1032. More photo diodes 1032 indicate more channels of the output PPG signals, and higher detection accuracy.

In a possible implementation, the plurality of photo diodes are arranged in a ring shape around the light-emitting diodes in an area where the electronic device is in contact with the human tissue. Therefore, each photo diode evenly receives the light from the light-emitting diode.

In a possible implementation, the electronic device is a smart watch. The electronic device may be a wearable device, for example, a smart watch, a smart bracelet, smart glasses, or the like; or the electronic device may be a terminal device, for example, a mobile phone, a heart rate monitor, an oximeter, or the like.

According to a third aspect, a computer-readable storage medium is provided, including instructions, where the instructions, when executed on an electronic device, cause the electronic device to perform the method according to the first aspect and any implementation thereof.

According to a fourth aspect, a computer program produce including instructions is provided, where the instructions, when executed on the foregoing electronic device, cause the electronic device to perform the method according to the first aspect and any implementation thereof.

According to a fifth aspect, a chip system is provided. The apparatus includes a processor and an interface circuit, and the interface circuit is configured to read instructions stored in a memory, and send the instructions to the processor. When executed by the processor, the instructions may cause the electronic device to perform the method according to the first aspect and any implementation thereof. The chip system may include a chip and other discrete devices.

For the technical effects brought by any one of the implementations according to the third aspect to the fifth aspect, reference may be made to the technical effects brought by the first aspect and any implementation thereof, and details are not described herein again.

DETAILED DESCRIPTION OF ILLUSTRATIVE EMBODIMENTS

Figure 1:
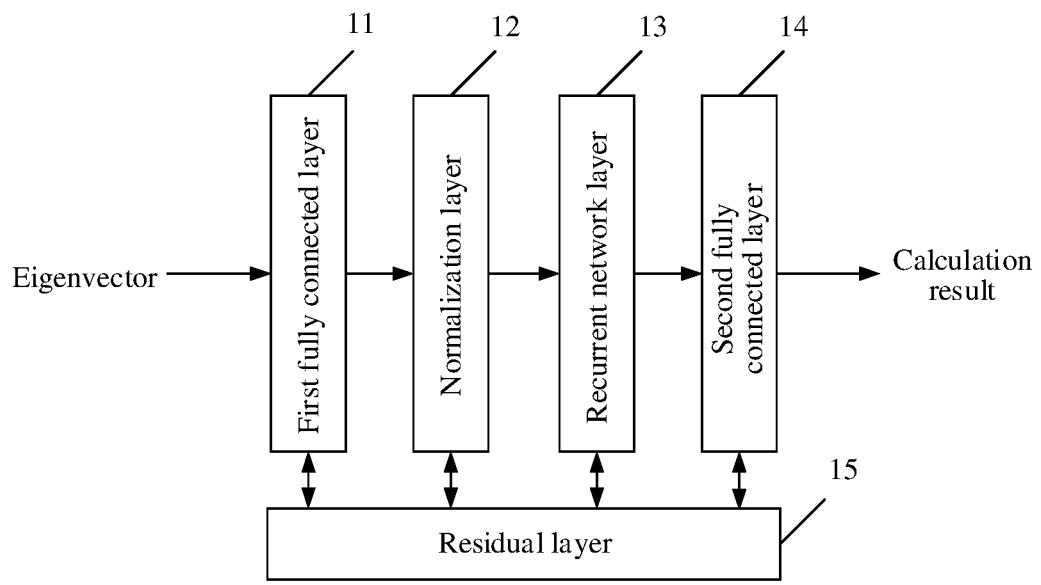
FIG. 1 is a schematic diagram of a deep sequence neural network according to an embodiment of this application.

It should be noted that, in the embodiments of this application, terms such as "first" and "second" are merely used for distinguishing features of same type, and cannot be understood as an indication of relative importance, a quantity, or a sequence.

In the embodiments of this application, the terms "exemplary" or "for example" is used to represent giving an example, an illustration, or a description. Any embodiment or design scheme described as "exemplary" or "for example" in this application should not be explained as being more preferred or having more advantages than another embodiment or design scheme. Exactly, use of the word "exemplary" or "for example" or the like is intended to present a related concept in a specific manner.

In the embodiments of this application, the terms "couple" or "connection" should be understood in a broad sense. For example, the connection may be a physically direct connection, or an indirect connection realized through an electronic device, such as a connection realized through a resistor, an inductor, a capacitor, or other electronic devices.

First, some concepts involved in this application are described as follows:

Variance: Assuming that there is a time sequence $X_1, X_2, X_3, \ldots, X_i$ (i=1, 2, ..., n) a variance of the time sequence $X_1, X_2, X_3, \ldots, X_i$ (i=1, 2, ..., n) is expressed as $\delta^2 = D(X_i) = E((X_i - \mu_x)^2)$, where E( ) represents averaging, and $\mu_x$ represents a mean value of the time sequence $X_1, X_2, X_3, \ldots, X_i$ (i=1, 2, ..., n).

Pearson correlation coefficient: A Pearson correlation coefficient between a variable X and a variable Y is shown in the following formula 1:

$$\rho_{XY} = \frac{\text{cov}(X, Y)}{\delta_X \delta_Y} = \frac{E[(X - \mu_X)(Y - \mu_Y)]}{\delta_X \delta_Y}, \quad \text{Formula 1}$$

where
cov(X, Y) represents a covariance between the variable X and the variable Y, $\delta_X$ represents a standard deviation of the variable X, $\delta_Y$ represents a standard deviation of the variable Y, $\mu_X$ represents a mean value of the variable X, $\mu_Y$ represents a mean value of the variable Y, and E( ) represents averaging.

Extending the foregoing formula, assuming that a quantity of sample points is n, a Pearson correlation coefficient between n sample points $X_1, X_2, X_3, \ldots, X_i$ (i=1, 2, ..., n) and n sample points $Y_1, Y_2, Y_3, \ldots, Y_i$ (i=1, 2, ..., n) is shown in the following formula 2:

$$\gamma = \frac{\sum_{i=1}^{n}(X_i - \bar{X})\sum_{i=1}^{n}(Y_i - \bar{Y})}{\sqrt{\sum_{i=1}^{n}(X_i - \bar{X})^2}\sqrt{\sum_{i=1}^{n}(Y_i - \bar{Y})^2}}, \quad \text{Formula 2}$$

where $\overline{X}$ represents a mean value of the n sample points $X_1$, $X_2$, $X_3$, ..., $X_i$ (i=1, 2, ..., n) $\overline{Y}$ represents a mean value of then sample points $Y_1$, $Y_2$, $Y_3$, ..., $Y_i$ (i=1, 2, ..., n), and n represents a quantity of sample points.

The Pearson correlation coefficient between the n sample points $X_i$ (i=1, 2, ..., n) and the n sample points $Y_i$ (i=1, 2, ..., n) may further be expressed by a mean estimation of standard scores of the sample points, as shown in the following formula 3:

$$\gamma = \frac{1}{n}\sum_{i=1}^{n}\left(\frac{X_i - \overline{X}}{\delta_X}\right)\left(\frac{Y_i - \overline{Y}}{\delta_Y}\right), \quad \text{Formula 3}$$

where $$\frac{X_i - \overline{X}}{\delta_X}$$

represents standard scores of the n sample points $X_1$, $X_2$, $X_3$, ..., $X_i$ (i=1, 2, ..., n), $$\frac{Y_i - \overline{Y}}{\delta_Y}$$

represents standard scores of the n sample points $Y_1$, $Y_2$, $Y_3$, ..., $Y_i$ (i=1, 2, ..., n), $\overline{X}$ represents a mean value of the n sample points $X_1$, $X_2$, $X_3$, ..., $X_i$ (i=1, 2, ..., n), $\delta_X$ represents a standard deviation of the n sample points $X_1$, $X_2$, $X_3$, ..., $X_i$ (i=1, 2, ..., n), $\overline{Y}$ represents a mean value of the n sample points $Y_1$, $Y_2$, $Y_3$, ..., $Y_i$ (i=1, 2, ..., n) and $\delta_Y$ represents a standard deviation of the n sample points $Y_1$, $Y_2$, $Y_3$, ..., $Y_i$ (i=1, 2, ..., n).

Autocorrelation coefficient: Assuming that there is a time sequence $X_1$, $X_2$, $X_3$, ..., $X_i$ (i=1, 2, ..., n) and n represents a length of the time sequence $X_1$, $X_2$, $X_3$, ..., $X_i$ (i=1, 2, ..., n), a mean value of the time sequence $X_1$, $X_2$, $X_3$, ..., $X_i$ (i=1, 2, ..., n) is $\mu_X = E(X_i)$, a variance of the time sequence $X_i$ (i=1, 2, ..., n) is $\delta^2$, and a standard deviation of the time sequence $X_1$, $X_2$, $X_3$, ..., $X_i$ (i=1, 2, ..., n) is $\delta$. For two time sequences $X_1$, $X_2$, $X_3$, ..., $X_i$ (i=1, 2, ..., n) and $Y_1$, $Y_2$, $Y_3$ ..., $Y_i$ (i=1, 2, ..., n) of a same length, a correlation between the two time sequences can be expressed by a covariance $cov(X_i,Y_i)=E((X_i-\mu_X)(Y_i-\mu_Y))$. A larger absolute value of the covariance means a greater the correlation between the two time sequences (it is a positive correlation when the covariance is greater than 0, and it is a negative correlation when the covariance is less than 0). If one of the two time sequences (for example $Y_i$ (i=1, 2, ..., n)) is a time sequence (that is, $X_1$, $X_2$, $X_3$, ..., $X_i$ (i=1, 2, ..., n)) of another time sequence $Y_i=X_{i-k}$ lagged by k points, a biased estimate of an autocovariance of the time sequence $X_1$, $X_2$, $X_3$, ..., $X_i$ (i=1, 2, ..., n) can be obtained as shown in formula 4, an unbiased estimate of the autocovariance of the time sequence $X_1$, $X_2$, $X_3$, ..., $X_i$ (i=1, 2, ..., n) is obtained as shown in formula 5, and an autocorrelation coefficient of the time sequence $X_1$, $X_2$, $X_3$, ..., $X_i$ (i=1, 2, ..., n) can be obtained as shown in formula 6 according to the formula 4 and the formula 5.

$$c_k = E((X_i - \mu_X)(X_{i-k} - \mu_X)) = \frac{1}{N}\sum_{i=k+1}^{N}(x_i - \mu_X)(x_{i-k} - \mu_X), \quad \text{Formula 4}$$

where $$c_k = \frac{1}{N-k}\sum_{i=k+1}^{N}(x_i - \mu_X)(x_{i-k} - \mu_X) \quad \text{Formula 5}$$

$$acf(k) = r_k = \frac{c_k}{c_0} = \frac{N}{N-k}\frac{\sum_{i=k+1}^{N}(x_i - \mu_X)(x_{i-k} - \mu_X)}{\sum_{i=1}^{N}(x_i - \mu_X)(x_i - \mu_X)}, \quad \text{Formula 6}$$

where

Deep Sequence Neural Network: A deep sequence neural network is a deep neural network capable of accumulating time sequences, which can effectively eliminate sudden interference in the time sequences. As shown in FIG. 1, the deep sequence neural network includes a first fully connected layer 11, a normalization layer 12, a recurrent network layer 13 and a second fully connected layer 14. Optionally, a residual layer 15 is further included. Each layer includes at least one neuron. Neurons in the first fully connected layer 11 are fully connected to neurons in the normalization layer 12. The first fully connected layer 11 inputs an eigenvector, and outputs a non-linearized eigenvector to the normalization layer 12. The normalization layer 12 normalizes the eigenvector and outputs the eigenvector to the recurrent network layer 13, to accelerate the convergence of the deep sequence neural network. The recurrent network layer 13 realizes the accumulation of the time sequences of the normalized eigenvectors and outputs the time sequences to the second fully connected layer 14. Neurons in the second fully connected layer 14 are fully connected to neurons in the recurrent network layer 13, and the second fully connected layer is configured to output a final calculation result. The residual layer 15 may be located between any two adjacent layers in the first fully connected layer 11, the normalization layer 12, the recurrent network layer 13 and the second fully connected layer 14, and the residual layer 15 is configured to reduce a quantity of outputs of the previous layer and output to the next layer, to accelerate the convergence of the deep sequence neural network.

The method for training the deep sequence neural network is: assuming that there are a plurality of sets of data for training, each set of data for training includes an eigenvector for training and a correct first calculation result corresponding to the eigenvector. During training, each eigenvector for training is input into the neural network and a second calculation result is obtained. A loss function is calculated according to the first calculation result and the second calculation result corresponding to all the eigenvectors for training. When the loss function does not meet a condition, parameters of the neural network are adjusted according to a gradient descent method. The foregoing training process is repeated until the loss function meets the condition to stop adjusting the parameters of the neural network, that is, the training of the neural network is completed.

Figure 2:
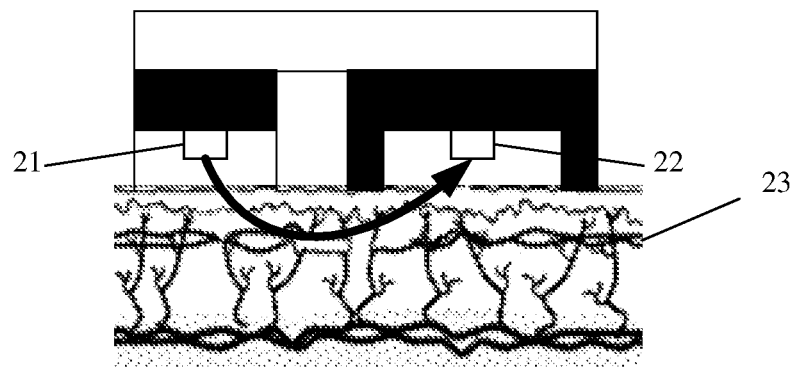
FIG. 2 is a schematic structural diagram of an apparatus for generating a PPG signal according to an embodiment of this application.

Photoplethysmographic (photoplethysmographic, PPG): As shown in FIG. 2, a light-emitting diode 21 illuminates skin tissue 23, and light reflected back through the skin tissue 23 is received by a photo diode 22 and converted into an electrical signal of a channel. The electrical signal is converted into a digital signal through analog-to-digital conversion. It should be noted that, in the embodiments of this application, electrical signals of one channel output by the photo diode are collectively referred to as PPG signals.

Figure 3:
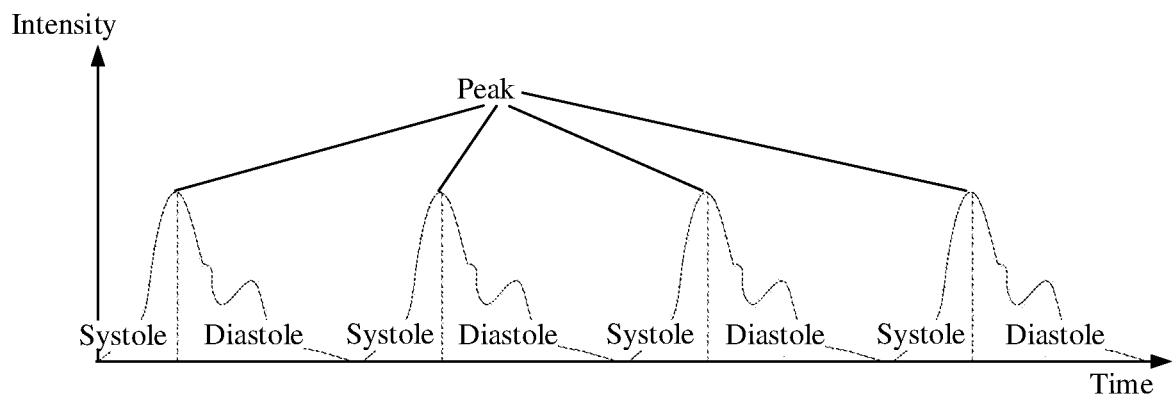
FIG. 3 is a schematic diagram of a principle of detecting heart rate based on a PPG signal according to an embodiment of this application.
Figure 4:
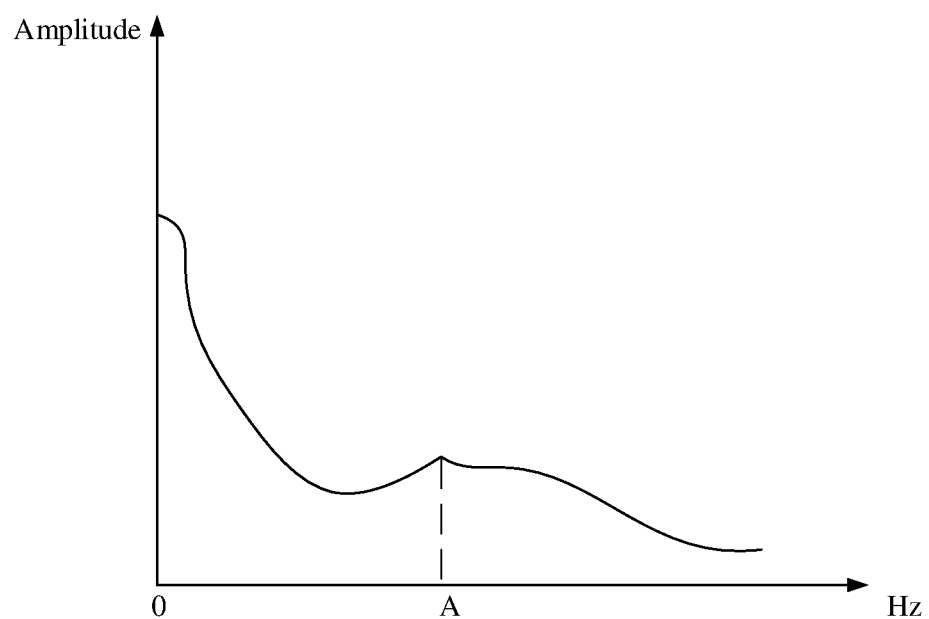
FIG. 4 is a schematic diagram of another principle of detecting heart rate based on a PPG signal according to an embodiment of this application.

Blood absorbs more green light, so the light-emitting diode 21 usually adopts green light so that an intensity change of the reflected light can better reflect the change of blood. Since the absorption of light by human tissue such as muscles, bones, and veins is basically unchanged, an electrical signal output by the photo diode 22 detecting the light reflected by the human tissue is a direct current signal. As shown in FIG. 3, due to a periodic change (diastole and systole) of blood flow in the artery, an electrical signal output by the photo diode detecting the light reflected by the arterial blood is an alternating current signal. Therefore, the PPG signals output by the photo diode include a direct current signal and an alternating current signal, and the vital sign detection can be realized by extracting the alternating current signal. Using heart rate as an example, as shown in FIG. 3, a time domain analysis method is to obtain the heart rate as N*60/T per minute by counting a quantity N of peaks (maximum intensity) of the alternating current signal in the PPG signal per unit time T. As shown in FIG. 4, another frequency domain analysis method is to perform fast Fourier transform (fast Fourier transform, FFT) on the PPG signal to obtain a frequency domain signal of the PPG signal. The energy near 0 Hz is the strongest, which corresponds to measurement values of the human tissue such as muscles, bones, and veins. The peak with the next strongest energy appears at A, which corresponds to measurement value of the heart rate, and the heart rate can be calculated as B=A*60 per minute.

Figure 5:
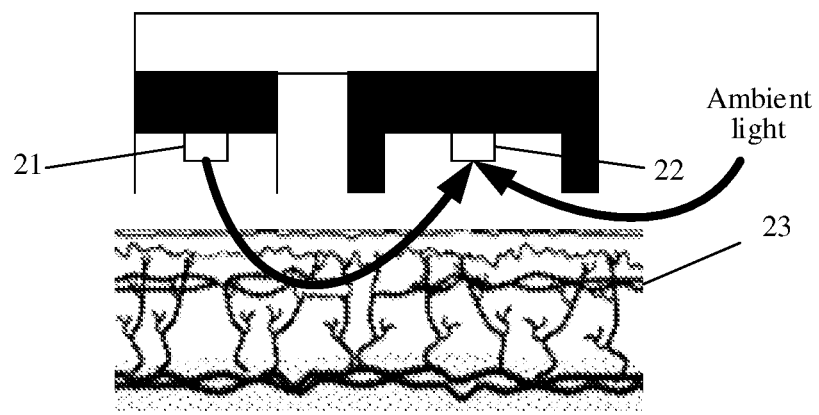
FIG. 5 is a schematic diagram of a principle that ambient light interference has an effect on a PPG signal according to an embodiment of this application.
Figure 6:
FIG. 6 is a schematic diagram of a user wearing an electronic device running according to an embodiment of this application.

The difficulty of the PPG is that due to factors such as ambient light interference, a baseline drift, a motion artifact, and the like, a large amount of noise may be introduced, resulting in the distortion of the PPG signal, so that accurate identification cannot be achieved. As shown in FIG. 5, the ambient light interference refers to: when the photo diode 22 is not in close contact with the skin tissue 23, the photo diode 22 not only detects the light emitted from the light-emitting diode 21, but also detects the ambient light, and the intensity of the ambient light is much greater than the intensity of the light emitted by the light-emitting diode 21, thereby causing serious interference to the PPG signal. The baseline drift refers to noise with a frequency below 1 Hz generated by human breathing and relative friction between the skin surface and a PPG sensor (the light-emitting diode 21 and the photo diode 22 in FIG. 2), and is superimposed with the alternating current signal corresponding to the heart rate, and a baseline drift signal can be separated by performing appropriate filtering on the PPG signal. As shown in FIG. 6, the motion artifact refers to the aliasing of high-frequency noise in the PPG signal when a user wearing an electronic device 60 is in a moving state (for example, walking, running, and the like) (see FIG. 7).

Figure 7:
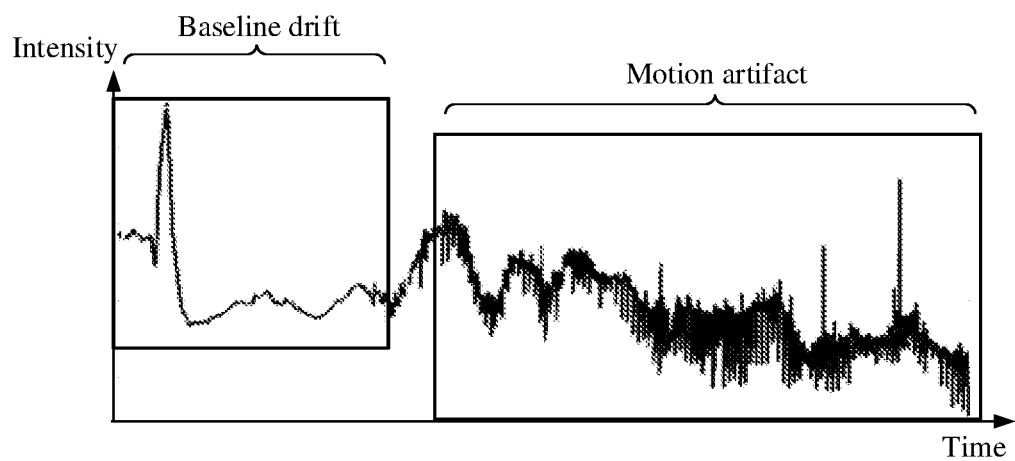
FIG. 7 is a schematic diagram of a baseline drift and a motion artifact affecting a PPG signal according to an embodiment of this application.
Figure 8:
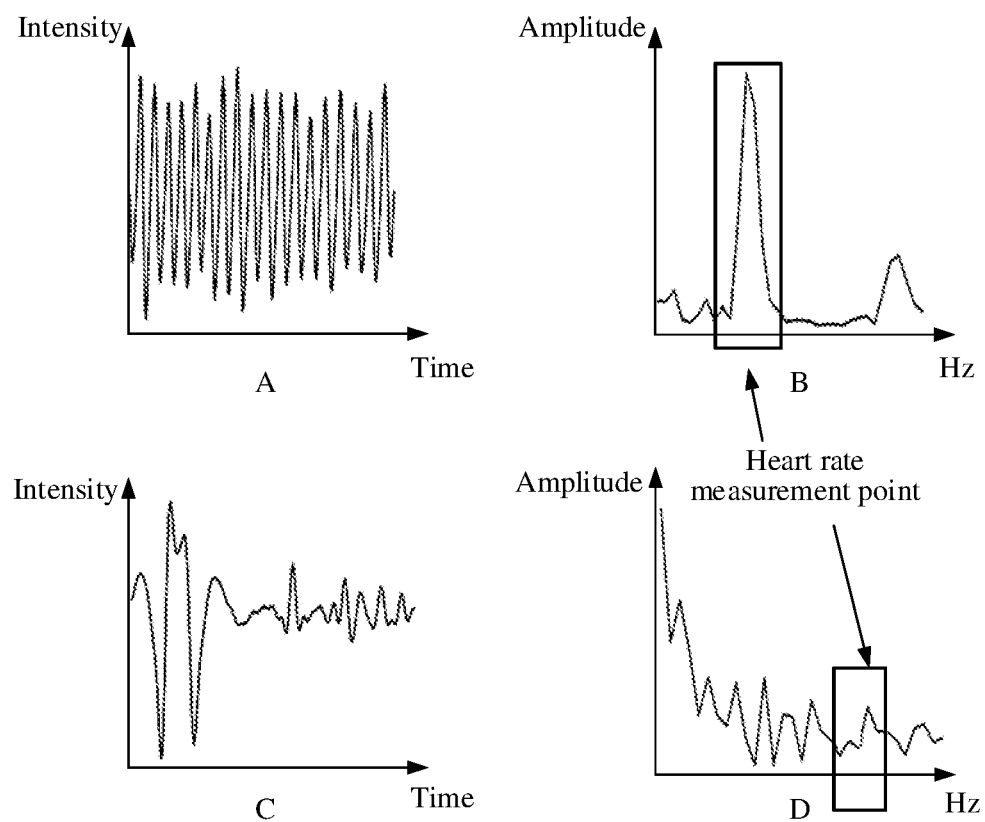
FIG. 8 is a schematic diagram of a static state and a motion state affecting a frequency domain signal of a PPG signal according to an embodiment of this application.

For example, as shown in FIG. 7, the baseline drift may generate low-frequency noise (changing slowly), which may affect a feature waveform change over a long period of time; and the motion artifact may generate high-frequency noise (changing fast) aliased with the heart rate feature waveform, which may affect a feature waveform change over a short period of time. As shown in FIG. 8, A is a time domain signal of the PPG signal in a static state, B is a frequency domain signal of the PPG signal in a static state, C is a time domain signal of the PPG signal in a moving state, and D is a frequency domain signal of the PPG signals in a moving state. By comparing A and C, it can be seen that the time domain signal of the PPG signal is relatively regular in the static state, and the time domain signal of the PPG signal is distorted in the moving state. By comparing B and D, it can be seen that an energy ratio of the heart rate measurement value of the frequency domain signal of the PPG signal in the static state is high, and the peak can be accurately determined; and an energy ratio of the heart rate measurement value of the time domain signal of the PPG signal in the moving state is very low, and the peak cannot be accurately determined.

Figure 10:
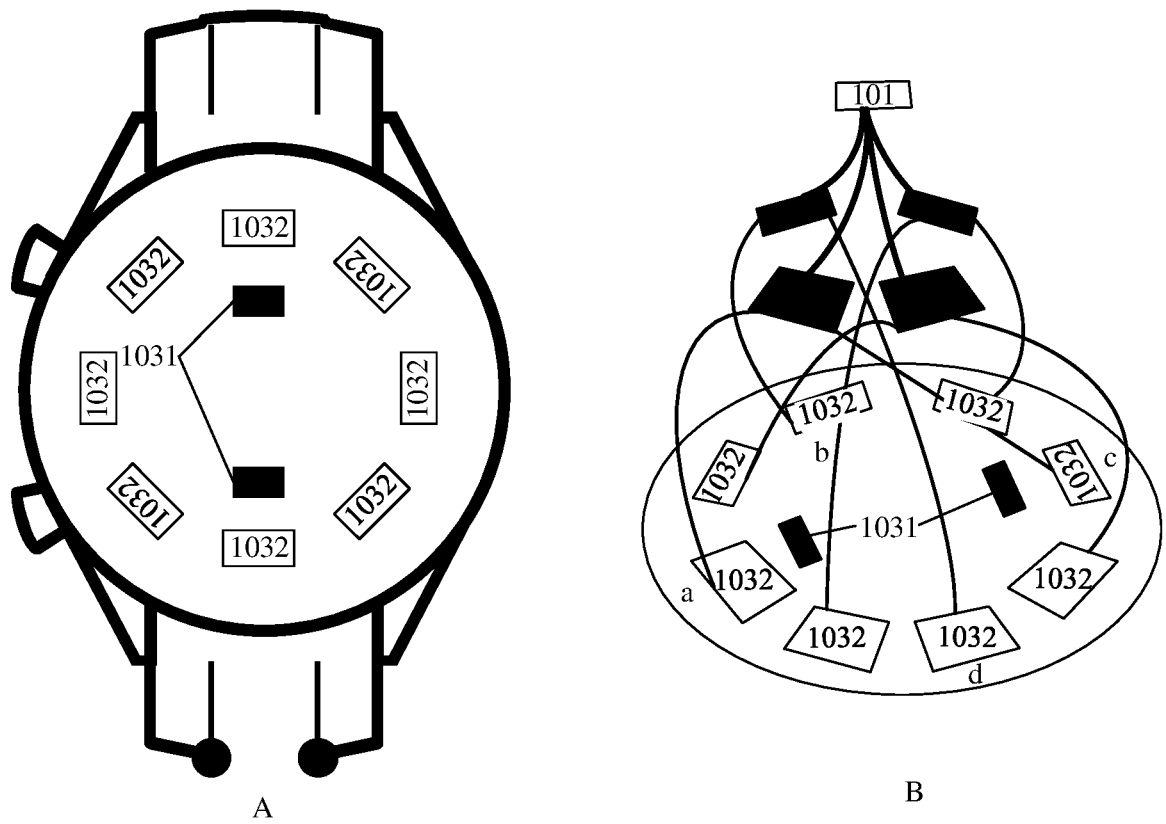
FIG. 10 is a schematic structural diagram of a smart watch according to an embodiment of this application.

An embodiment of this application provides an electronic device, configured to perform the vital sign detection method provided in the embodiments of this application. The electronic device may be a wearable device, for example, as shown in FIG. 10, a smart watch, a smart bracelet, smart glasses, or the like; or the electronic device may be a terminal device, for example, a mobile phone, a heart rate monitor, an oximeter, or the like. In the embodiments of this application, an example in which the electronic device is a smart watch is used, but is not intended to be limited thereto. The vital signs involved in the embodiments of this application may include, but are not limited to heart rate, blood oxygen saturation (including oxyhemoglobin and reduced hemoglobin), and the like.

Figure 9:
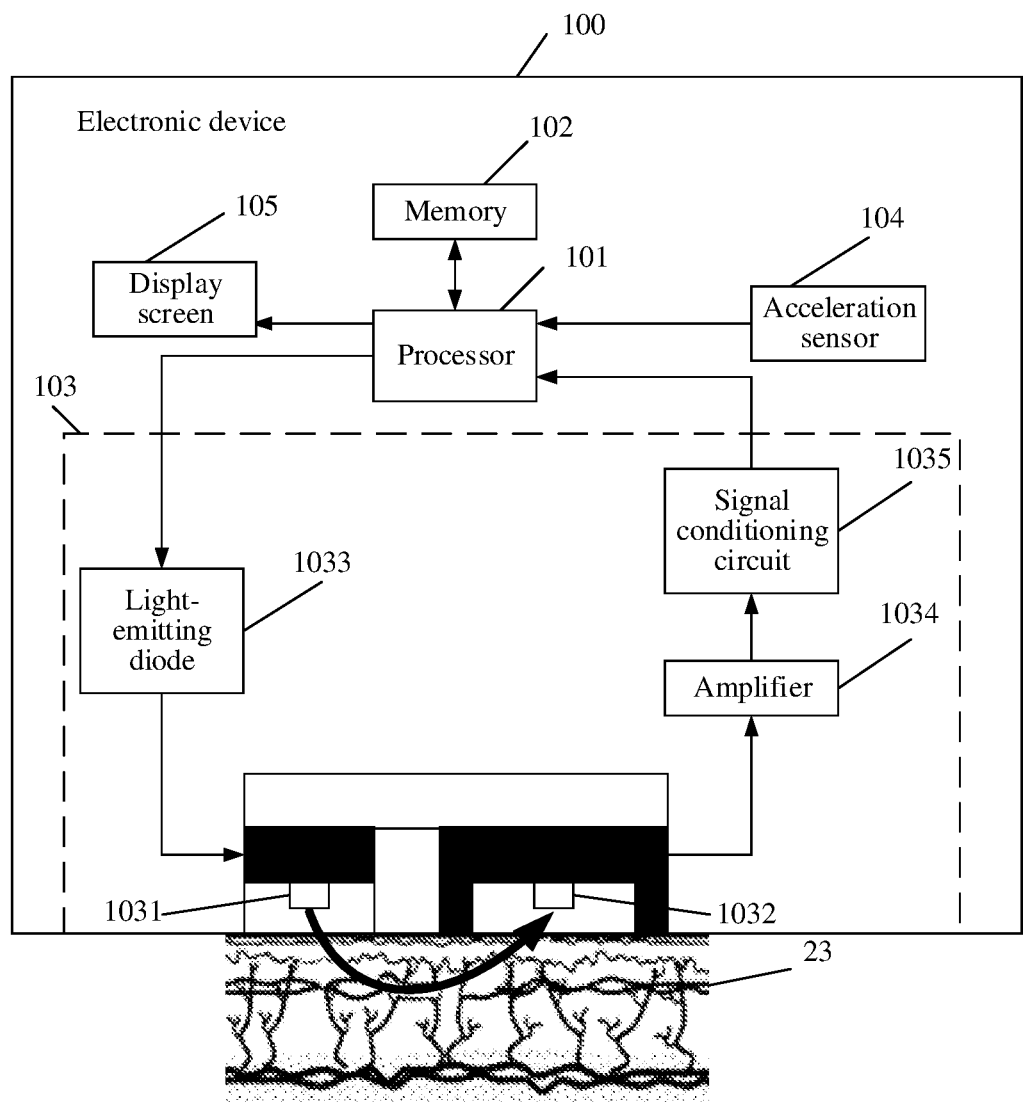
FIG. 9 is a schematic structural diagram of an electronic device according to an embodiment of this application.

As shown in FIG. 9, the electronic device 100 includes a processor 101, a memory 102, a PPG circuit 103, an acceleration sensor 104 and a display screen 105. The PPG circuit 103 includes at least one light-emitting diode 1031, at least one photo diode 1032, a light-emitting diode drive circuit 1033, an amplifier 1034 and a signal conditioning (signal conditioning) circuit 1035. The memory 102 and the processor 101 may be integrated in a system on chip (system on chip, SoC) or may be separately disposed. The light-emitting diode 1031 and the photo diode 1032 may be integrated in a micro translation stage (micro translation stage) or may be separately disposed. In addition, a quantity of the light-emitting diodes 1031 may be the same as or different from a quantity of the photo diodes 1032.

The PPG circuit 103 is configured to output a PPG signal to the processor 101, and the acceleration sensor 104 is configured to output an acceleration signal (at least one of X/Y/Z axis acceleration signals) to the processor 101.

The light-emitting diode 1031 can emit light of a specific wavelength, for example, the light-emitting diode 1031 can emit green light, red light, infrared light, and the like, respectively in a time division manner, or can emit a combination of these lights, which is not limited in this application. When the light-emitting diode 1031 emits green light, the electronic device 100 can detect the heart rate (that is, output the heart rate). When the light-emitting diode 1031 emits red light, the electronic device 100 can detect the oxyhemoglobin (that is, a ratio of outputting the oxyhemoglobin). In addition, when the light-emitting diode 1031 emits infrared light, the electronic device 100 can detect the reduced hemoglobin (that is, a ratio of outputting the reduced hemoglobin). It should be noted that, in the embodiments of this application, a description is made by using heart rate detection as an example, but is not intended to be limited thereto.

The light-emitting diode driving circuit 1033 is configured to provide a driving current to the light-emitting diode 1031. A driving capability of each pin of the processor 101 is usually limited, and it is difficult to drive the light-emitting diode 1031 to emit light. Therefore, in the embodiments of this application, the processor 101 may output a control signal to the light-emitting diode driving circuit 1033 to control the light-emitting diode driving circuit 1033 to provide the driving current to the light-emitting diode 1031.

Each photo diode 1032 is configured to detect the light from the light-emitting diode 1031 reflected by the human tissue, and output a PPG signal of one channel, and a plurality of photo diodes 1032 can output PPG signals of a plurality of channels. The magnitude of the PPG signal output by the photo diode 1032 is related to the intensity of the light detected by the photo diode 1032. Greater intensity of the light detected by the photo diode 1032 indicates a greater output PPG signal, and smaller intensity of the light detected by the photo diode 1032 indicates a smaller output PPG signal.

As shown in A and B in FIG. 10, using the electronic device as a smart watch as an example, the light-emitting diode 1031 and the photo diode 1032 may be located at a bottom of the watch so as to be in contact with the human tissue. There may be a plurality of light-emitting diodes 1031 and photo diodes 1032. This application does not limit a quantity of the light-emitting diodes 1031 and the photo diodes 1032. For example, there may be 2, 4 or any other number of the light-emitting diodes 1031, and there may be 2, 4, 8 or any other number of the photo diodes 1032. More light-emitting diodes 1031 indicate higher light intensity, and better anti-interference performance of ambient light. More photo diodes 1032 indicate more channels of the output PPG signals, and higher detection accuracy.

The light-emitting diodes 1031 are kept as far away as possible to reduce the correlation, and the photo diodes 1032 are kept as far away as possible to reduce the correlation, thereby improving the measurement accuracy. For example, as shown in A in FIG. 10, a plurality of (for example, 2) light-emitting diodes 1031 are arranged opposite to each other, and a plurality of (for example, 8) photo diodes 1032 surround the light-emitting diodes 1031 in an area where the electronic device is in contact with the human tissue (for example, the bottom of a smart watch) and are arranged in a ring shape (symmetrical), so that each photo diode 1032 receives light from the light-emitting diodes 1031 in a balanced manner.

Each photo diode 1032 can output a PPG signal of one channel. In order to reduce a quantity of channels, to reduce data storage and calculation pressure, and then reduce power consumption, the PPG signals output by a plurality of (for example, 2, 4, or 8) photo diodes 1032 can be combined. For example, as shown in B in FIG. 10, among the 8 photo diodes 1032 arranged symmetrically in a ring shape, PPG signals output by two (that is, a pair of) photo diodes 1032 located in symmetrical positions can be combined (current summing), and then PPG signals of 4 channels can be combined and output to the processor 101. When the user wearing the smart watch is exercising, even if one photo diode 1032 of the paired two photo diodes 1032 is far away from the human tissue, the other photo diode 1032 can be close to the human tissue. Combining the PPG signals output by the two photo diodes 1032 can achieve an objective of comprehensively reducing noise.

The amplifier 1034 is configured to amplify the PPG signal output by the photo diode 1032.

The signal conditioning circuit 1035 is configured to perform processing such as noise reduction and bandpass filtering on the PPG signal.

The display screen 105 may be configured to display the value of the vital sign. The display screen 105 may further have a touch function, and feedback a touch position of a user in the display screen 105 to the processor 101.

The memory 102 may include at least one of a volatile memory and a non-volatile memory. The non-volatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (random access memory, RAM), for example, a static RAM (static RAM, SRAM), a dynamic RAM (dynamic RAM, DRAM), a synchronous DRAM (synchronous DRAM, SDRAM), a double data rate SDRAM (double data rate SDRAM, DDR SDRAM), an enhanced SDRAM (enhanced SDRAM, ESDRAM), a synchlink DRAM (synchlink DRAM, SLDRAM), and a direct rambus RAM (direct rambus RAM, DRRAM). The memory 102 is configured to store a program, an instruction and related data. When the program and the instruction are executed by the processor 101, the vital sign detection method provided in the embodiments of this application may be performed.

The processor 101 may be a chip, for example, a field programmable gate array (field programmable gate array, FPGA), an application specific integrated circuit (application specific integrated circuit, ASIC), a central processor unit (central processor unit, CPU), a network processor (network processor, NP), a digital signal processor (digital signal processor, DSP), a micro controller unit (micro controller unit, MCU), a programmable logic device (programmable logic device, PLD) or another integrated chip. The processor 101 performs the vital sign detection method provided in the embodiments of this application by executing the program and instruction stored in the memory 102.

Figure 11:
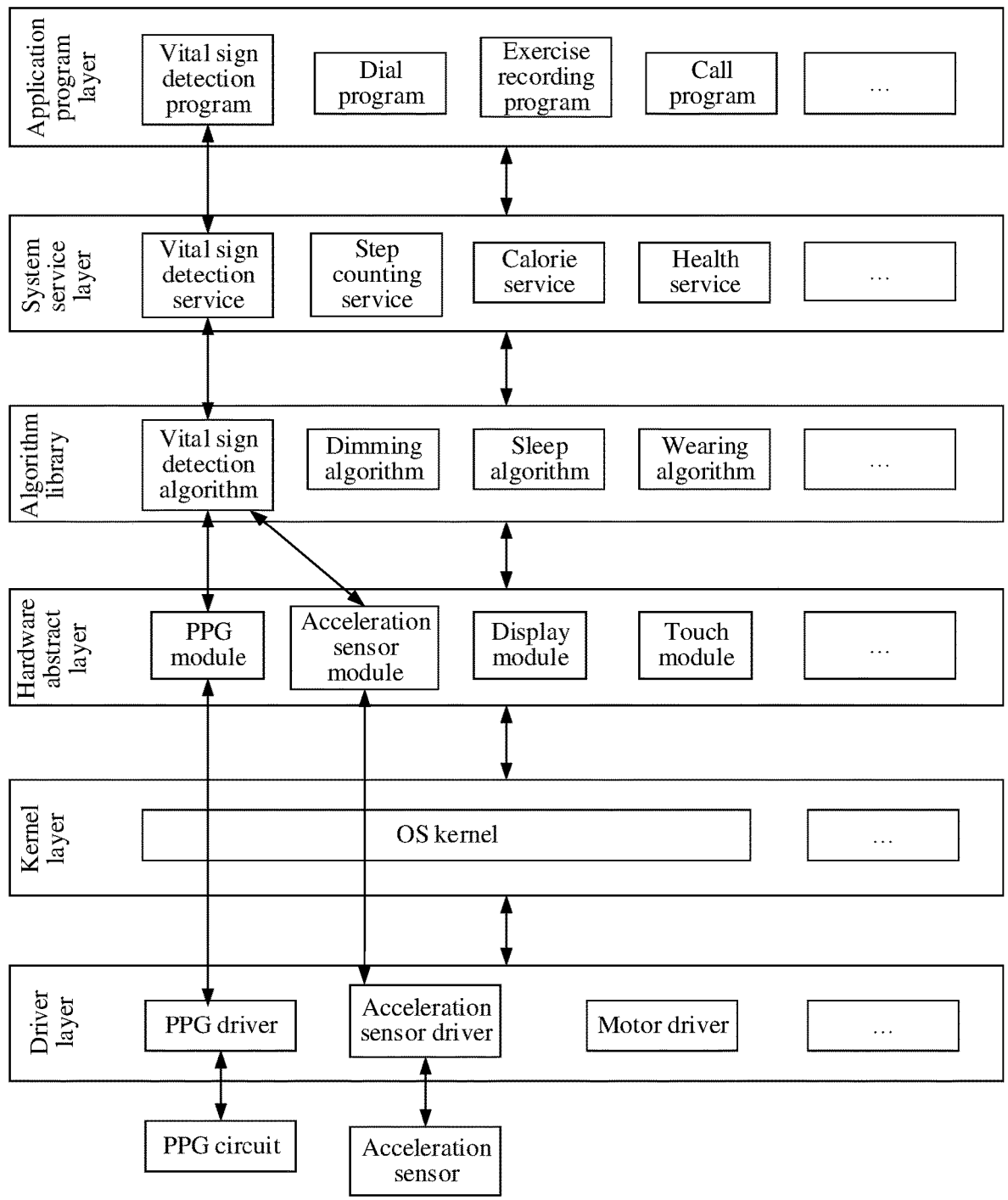
FIG. 11 is a schematic diagram of a processor running software architecture according to an embodiment of this application.

A program run by the processor 101 may be based on an operating system, for example, an Android (Android) operating System®, an Apple (iOS) operating System®, a Harmony (Harmony) operating System®, a Windows (Windows) operating system, and the like. As shown in FIG. 11, using the program run by the processor 101 based on the Android operating System® as an example, the program run by the processor 101 is layered according to functions, and may include an application program layer, a system service layer, an algorithm library hardware abstract layer, a kernel layer and a driver layer.

The driver layer is configured to drive hardware resources. The driver layer may include a PPG driver, an acceleration sensor driver, a motor driver, and the like. The PPG driver is configured to drive the PPG circuit 103 and provide a PPG signal to an upper-layer software (for example, a PGG module in the hardware abstract layer). The acceleration sensor driver is configured to drive the acceleration sensor 104 and provide an acceleration signal to the upper-layer software (for example, an acceleration sensor module in the hardware abstract layer).

The kernel layer includes an operation system (operation system, OS) kernel (kernel). The operation system kernel is configured to manage a process, a memory, a driver program, a file system, and a network system of the system.

The hardware abstract layer (hardware abstract layer, HAL) is configured to abstract the hardware. The hardware abstract layer includes a PPG module, an acceleration sensor module, a display module, a touch module, and the like. The PGG module is configured to abstract the PPG hardware, and the abstracted PPG circuit is called by a vital sign detection algorithm in an algorithm library, so as to provide a PPG signal to the vital sign detection algorithm. The acceleration sensor module is configured to abstract the acceleration sensor, and the abstracted acceleration sensor is called by the vital sign detection algorithm in the algorithm library, so as to provide an acceleration signal to the vital sign detection algorithm.

The algorithm library may include a vital sign detection algorithm (for example, a heart rate algorithm, a blood oxygen saturation algorithm), a dimming algorithm, a sleep algorithm, a wearing algorithm, and the like. The vital sign detection algorithm is configured to perform the vital sign detection method provided in the embodiments of this application.

The system service layer may include a vital sign detection service (for example, a heart rate service, a blood oxygen saturation service), a step counting service, a calorie service, a health service, and the like. The vital sign detection service is used for providing a vital sign detection program with a service of calling the vital sign detection algorithm.

The application layer can include a vital sign detection program (for example, a heart rate program, a blood oxygen saturation program), a dial program, an exercise recording program, a call program, and the like. The vital sign detection program is configured to output a result of the vital sign detection.

A working principle of the electronic device performing the vital sign detection method is as follows: The processor 101 controls the light-emitting diode 1031 to emit light to the skin tissue through the light-emitting diode driving circuit 1033, and light reflected back through the skin tissue 23 is received by the photo diode 1032 and converted into a PPG signal. The amplifier 1034 amplifies the PPG signal and outputs the amplified PPG signal to the signal conditioning circuit 1035, and the signal conditioning circuit 1035 performs noise reduction, bandpass filtering and other processing on the PPG signal and sends the processed PPG signal to the processor 101. The processor 101 may have a built-in analog-to-digital conversion circuit or the electronic device may further include an analog-to-digital conversion circuit (not shown in the figure). The analog-to-digital conversion circuit obtains a PPG signal in a digital form after the analog-to-digital conversion of the PPG signal, and the analog-to-digital conversion circuit obtains an acceleration signal in a digital form after the analog-to-digital conversion of the acceleration signal output by the acceleration sensor 104. The processor 101 obtains a value of a vital sign (for example, heart rate, blood oxygen saturation, and the like) according to the digital PPG signal and the acceleration signal, and controls the display screen 105 to display the value of the vital sign.

Figure 12:
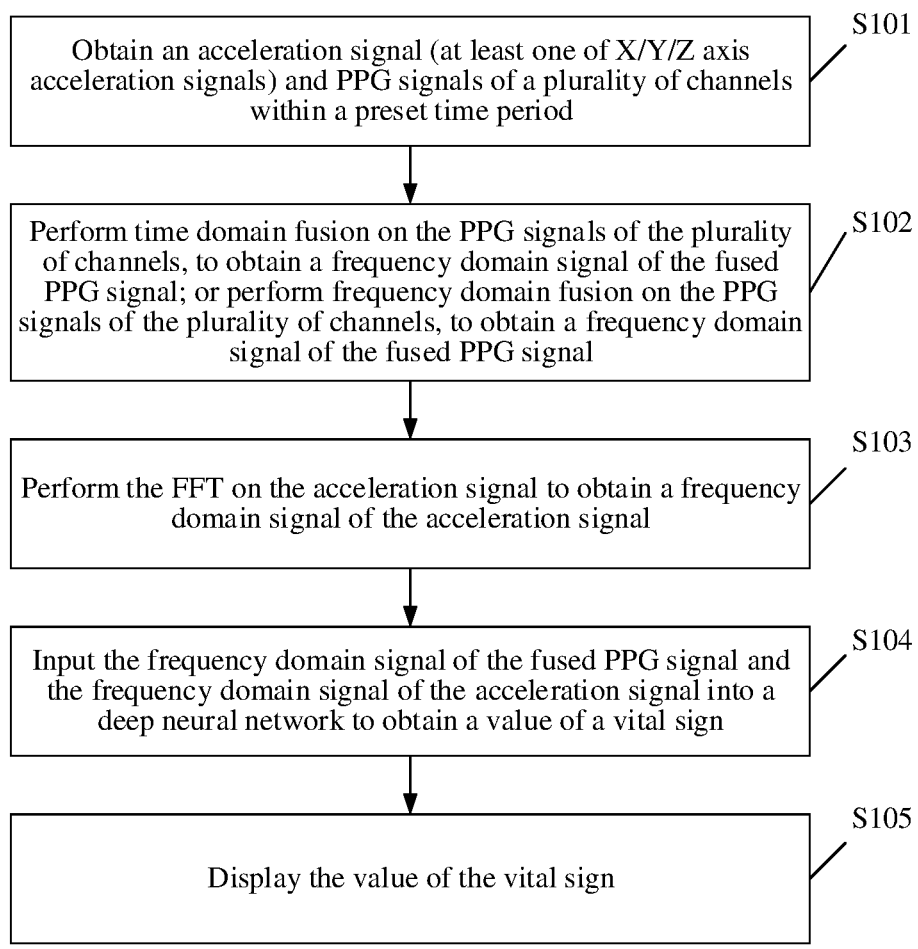
FIG. 12 is a schematic flowchart of a vital sign detection method according to an embodiment of this application.

How the processor 101 performs the vital sign detection method is described below. As shown in FIG. 12, the method includes steps S101 to S105:

S101: Obtain an acceleration signal (at least one of X/Y/Z axis acceleration signals) and PPG signals of a plurality of channels within a preset time period.

The PPG signals of the plurality of channels may be PPG signals output by all photo diodes, or, may be PPG signals output by some photo diodes, or, may be PPG signals of the plurality of channels obtained by combining the PPG signals output by the plurality of photo diodes. Specifically, how to select the PPG signals of the plurality of channels is controlled by a switch of a vital sign detection function and a switch of a vital sign detection enhancement function.

Figure 13:
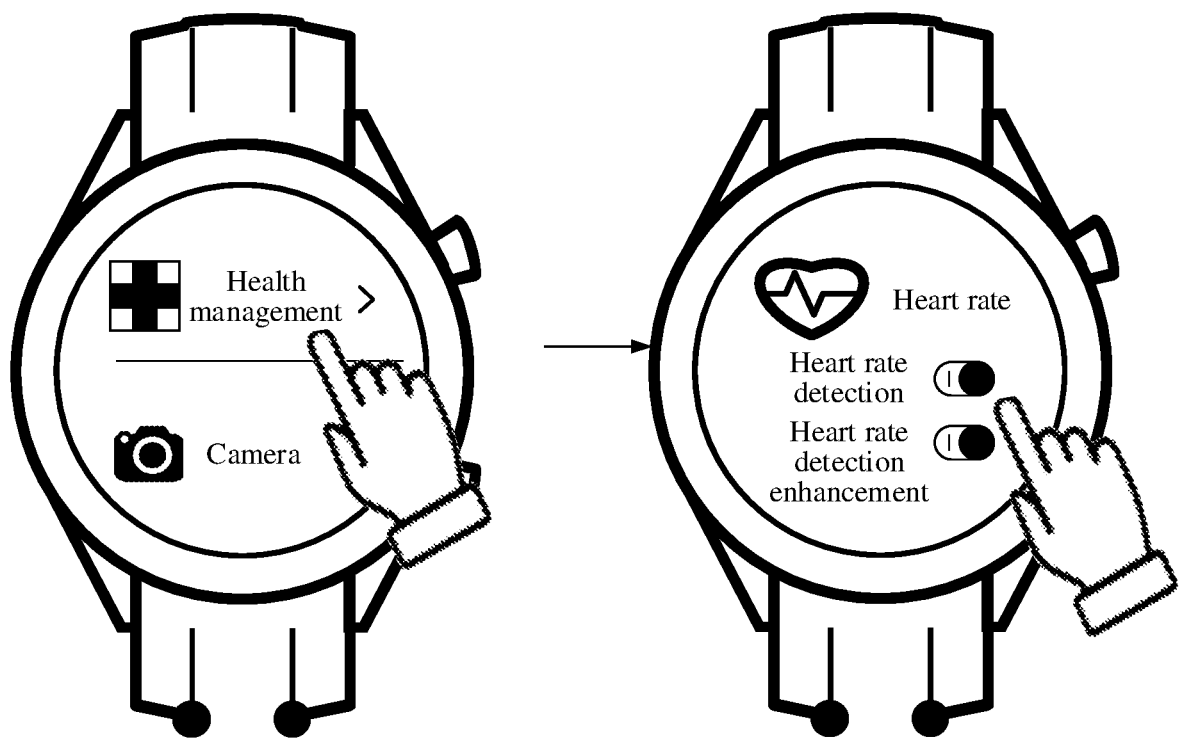
FIG. 13 is a schematic diagram of a switch of a vital sign detection function and a switch of a vital sign detection enhancement function according to an embodiment of this application.
Figure 14:
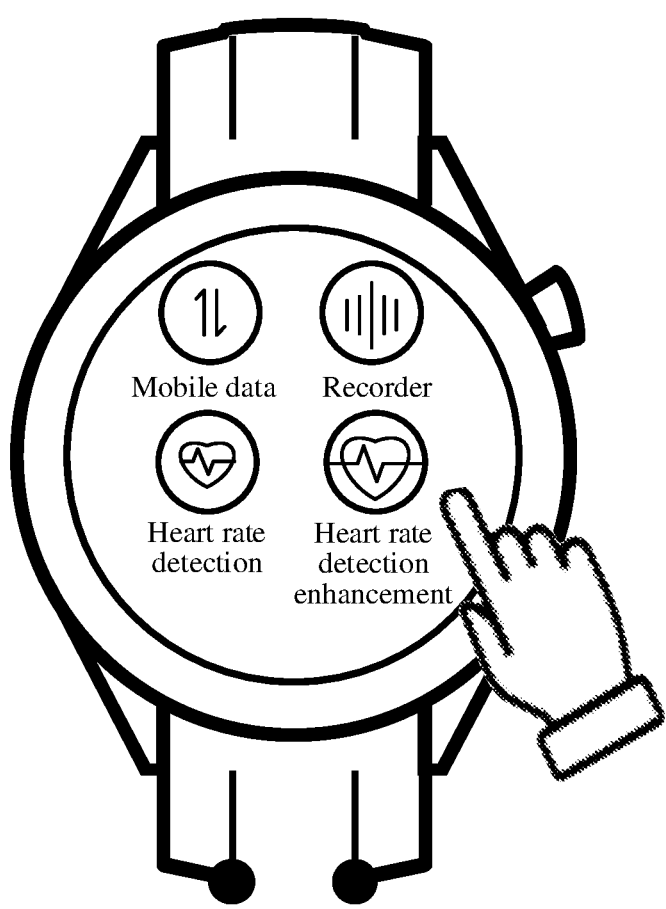
FIG. 14 is a schematic diagram of a switch of another vital sign detection function and a switch of another vital sign detection enhancement function according to an embodiment of this application.

Using the electronic device as a smart watch and the vital sign detection as heart rate detection as an example, for example, as shown in FIG. 13 and FIG. 14, the switch of the vital sign detection function (for example, a "Heart rate detection" switch) or the switch of the vital sign detection enhancement function (for example, a "Heart rate detection enhancement" switch) can be displayed in a setting interface (FIG. 13) or a shortcut menu (FIG. 14). The switch of the vital sign detection enhancement function may depend on the switch of the vital sign detection function. When the switch of the vital sign detection function is turned on, the user can control the switch of the vital sign detection enhancement function.

The processor 101 can turn on or off the function of the vital sign detection (for example, heart rate detection) in response to a click operation of the user on the switch of the vital sign detection function. When the switch is turned on, the electronic device may perform the vital sign detection method, and when the switch is turned off, the electronic device does not perform the vital sign detection method.

The processor 101 can turn on or off the enhancement function of the vital sign detection (for example, heart rate detection) in response to a click operation of the user on the switch of the vital sign detection enhancement function. When the switch is turned on (that is, in response to the first operation), the processor 101 can increase the quantity of the channels, that is, selecting PPG signals of more (for example, all) channels for performing the vital sign detection method, thereby increasing the accuracy. For example, as shown in A in FIG. 10, the PPG signals output by all 8 photo diodes 1032 are selected for performing the vital sign detection method. When the switch is turned off (that is, in response to the second operation), the processor 101 can reduce the quantity of the channels, that is, selecting PPG signals of fewer channels for performing the vital sign detection method, to reduce data storage and calculation pressure, and then reduce power consumption. For example, as shown in FIG. 10, the electronic device can combine the PPG signals output by the plurality of photo diodes 1032, or the electronic device can select the PPG signals output by some photo diodes 1032 (for example, a, b, c and d in B in FIG. 10).

The acceleration signal is from the acceleration sensor described above.

The PPG signal and the acceleration signal here may be time domain signals obtained after processing such as noise reduction, bandpass filtering, and may be digital signals obtained after analog-to-digital conversion. For example, the preset time period may be 12 seconds, a quantity of sample points of both the acceleration signal and the PPG signal of each channel within the preset time period may be 300, and the bandwidth of the bandpass filtering of the PPG signal may be [0.3 Hz, 4 Hz], so as to filter out the direct current signal described above, and only retain the alternating current signal corresponding to the vital sign (such as heart rate).

Figure 15:
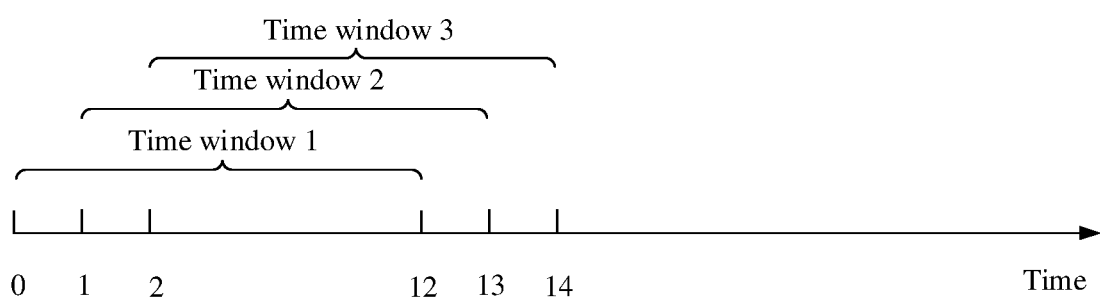
FIG. 15 is a schematic diagram of obtaining an acceleration signal and PPG signals of a plurality of channels within a preset time period by sliding a time window according to an embodiment of this application.

It should be noted that, the processor 101 can obtain an acceleration signal and PPG signals of a plurality of channels within a preset time period by sliding a time window. For example, as shown in FIG. 15, the processor 101 may obtain an acceleration signal in the time window 1 (0-12 seconds) and the PPG signals of the plurality of channels in the 12th second, obtain an acceleration signal in the time window 2 (1-13 seconds) and the PPG signals of the plurality of channels in the 13th second, and obtain an acceleration signal in the time window 3 (2-14 seconds) and the PPG signals of the plurality of channels in the 14th second.

S102: Perform time domain fusion on the PPG signals of the plurality of channels, to obtain a frequency domain signal of the fused PPG signal; or perform frequency domain fusion on the PPG signals of the plurality of channels, to obtain a frequency domain signal of the fused PPG signal.

Performing time domain fusion on the PPG signals of a plurality of channels, or performing frequency domain fusion on the PPG signals of a plurality of channels, either of the two can be selected to be performed; or the two can be performed conditionally, that is, when a first condition is satisfied, time domain fusion is performed on the PPG signals of the plurality of channels, and when a second condition is satisfied, frequency domain fusion is performed on the plurality of channels. For example, when the noise interference in the PPG signals of the plurality of channels is relatively small (for example, less than a preset threshold, that is, the quality is better), the time domain fusion is performed on the PPG signals of the plurality of channels, and when the noise interference in the PPG signals of the plurality of channels is relatively large (for example, greater than the preset threshold, that is, the quality is poor), the frequency domain fusion is performed on the PPG signals of the plurality of channels.

Perform time domain fusion on the PPG signals of the plurality of channels: First, PPG signals satisfying a certain condition in the PPG signals of the plurality of channels are fused in the time domain to obtain a time domain signal of the fused PPG signal, and then the FFT is performed on the time domain signal of the fused PPG signal to obtain a frequency domain signal of the fused PPG signal.

Perform frequency domain fusion on the PPG signals of the plurality of channels: First, FFT is performed on the PPG signals of the plurality of channels to obtain frequency domain signals of the PPG signals of the plurality of channels, and then the frequency domain signals are fused to obtain a frequency domain signal of the fused PPG signal.

Figure 16:
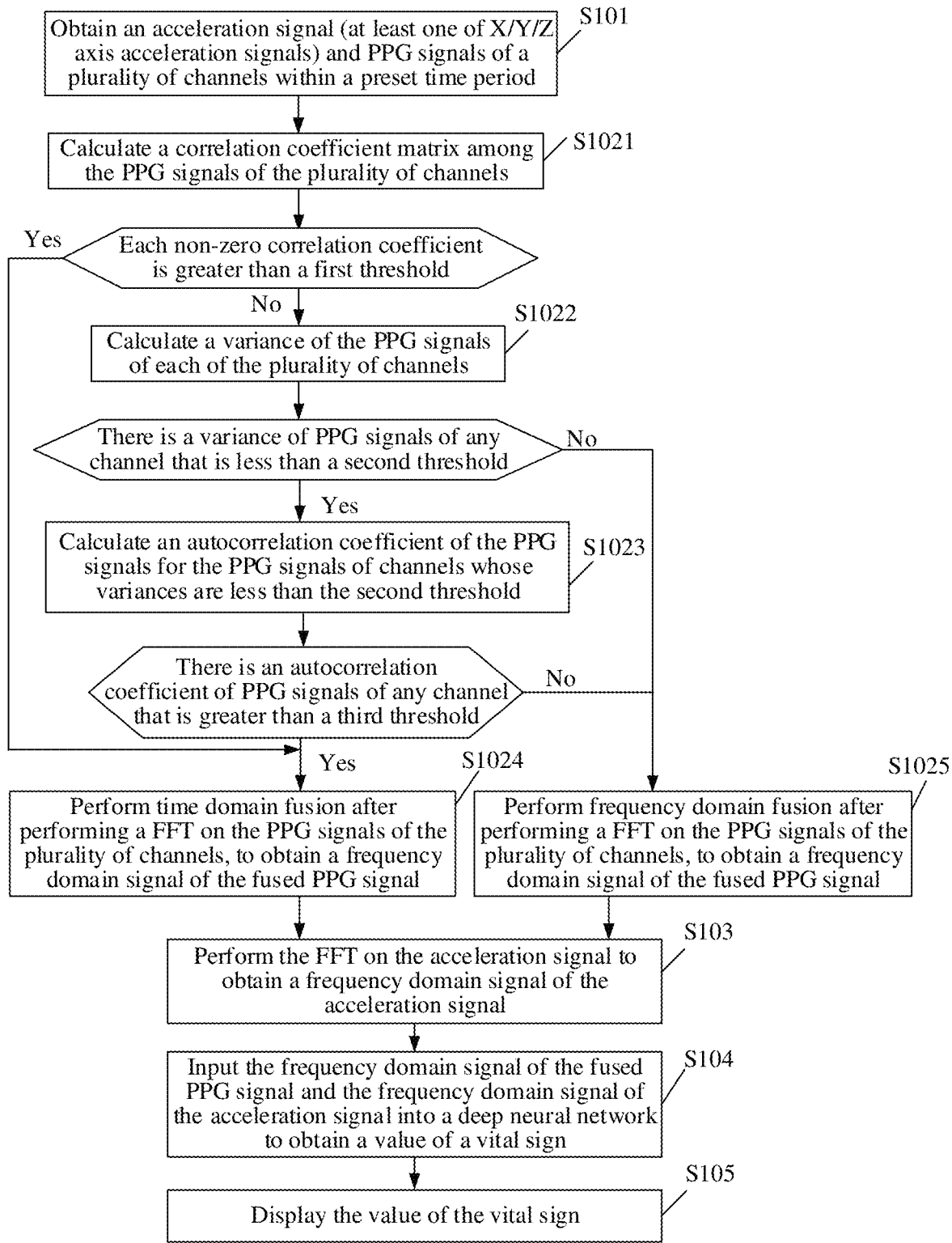
FIG. 16 is a schematic flowchart of another vital sign detection method according to an embodiment of this application.

In a possible implementation, as shown in FIG. 16, this step may include S1021 to S1025:

S1021: Calculate a correlation coefficient matrix among the PPG signals of the plurality of channels.

Figures 17, 18:
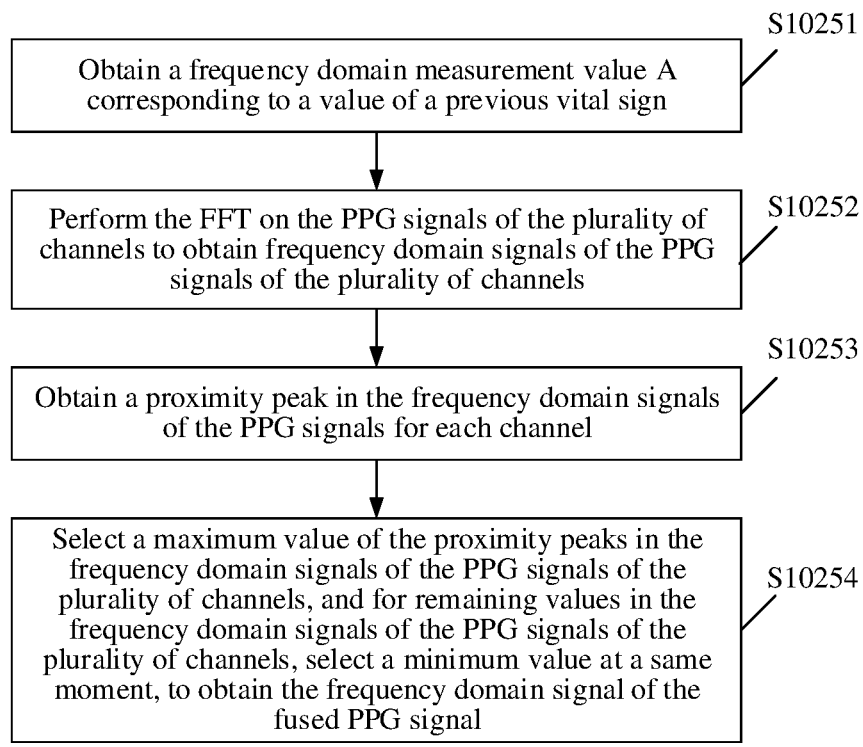
FIG. 17 is a schematic diagram of a correlation coefficient matrix according to an embodiment of this application.
FIG. 18 is a schematic flowchart of another vital sign detection method according to an embodiment of this application.

For example, using PPG signals of four channels as an example, as shown in FIG. 17, the correlation coefficient matrix may be a symmetric matrix. Each row and column of the correlation coefficient matrix represents a channel, and any value in the correlation coefficient matrix represents a correlation coefficient between the PPG signals of the two channels. The correlation coefficient represents a correlation between the PPG signals of the two channels. A larger correlation coefficient indicates a higher correlation between the PPG signals of the two channels, and a smaller correlation coefficient indicates a lower correlation between the PPG signals of the two channels.

In a possible implementation, the correlation coefficient matrix may be a Pearson correlation coefficient matrix. Any value in the Pearson correlation coefficient matrix represents a Pearson correlation coefficient between the PPG signals of the two channels. Using PPG signals of any two channels respectively as n sample points $X_i$ (i=2, . . . , n) and n sample points according to formula 2, a Pearson correlation coefficient between the PPG signals of any two channels can be obtained, and then a Pearson correlation coefficient matrix between the PPG signals of a plurality of channels can be obtained. For example, a quantity n of the sample points in formula 2 is 300.

If all correlation coefficients in the correlation coefficient matrix are greater than a first threshold, that is, the correlation between the PPG signals of any two channels is relatively high, then the first condition is considered to be satisfied, and the PPG signals of the plurality of channels are added to a set and step S1024 is performed. Otherwise (at least one correlation coefficient in the correlation coefficient matrix is less than or equal to the first threshold, that is, there is a relatively low correlation between the PPG signals of at least two channels), step S1022 is performed.

S1022: Calculate a variance of the PPG signals of each of the plurality of channels.

Using n sample points $X_1, X_2, X_3, \ldots, X_i$ (i=1, 2, . . . , n) of the PPG signal of each channel, a variance of the PPG signals of the channel can be calculated according to formula $$\delta^2 = \frac{1}{n}\sum_{i=1}^{n}(X_i - \mu)^2 (i = 1, 2, \ldots, n),$$

where μ represents a mean value of the n sample points. For example, a quantity n of the sample points is 300. The variance of the PPG signal of each channel represents a dispersion degree of the PPG signal of the channel, that is, a degree to which each sample point deviates from the mean value. When the variance is relatively large, it indicates that the PPG signal of the channel has a relatively large dispersion degree and is greatly interfered by noise. When the variance is relatively small, it indicates that the PPG signal of the channel has a relatively small dispersion degree and is less interfered by noise.

If a variance of PPG signals of any channel is less than a second threshold, that is, the PPG signal of any channel is less interfered by noise, step S1023 is performed. Otherwise (variances of PPG signals of all channels are greater than or equal to the second threshold, that is, the PPG signals of all channels are greatly interfered by noise), in this case, it is considered that the second condition is satisfied, and step S1025 is performed.

S1023: Calculate an autocorrelation coefficient of the PPG signals for the PPG signals of channels whose variances are less than the second threshold.

The autocorrelation coefficient of the PPG signal can be calculated according to formula 4 to formula 6. The autocorrelation coefficient represents the correlation between the PPG signals of a same channel at different times (that is, a quality of a periodicity), that is, the autocorrelation coefficient represents the effect of a past PPG signal of the same channel on a present PPG signal. A better periodicity of the PPG signal indicates a larger autocorrelation coefficient, and a worse periodicity of the PPG signal indicates a smaller the autocorrelation coefficient. For example, a time sequence length n in formula 4 to formula 6 is 300, and k is 25, that is, the autocorrelation coefficient represents a correlation between a PPG signal 25 sample points ago and a current PPG signal in a channel.

If an autocorrelation coefficient of PPG signals of any channel is greater than a third threshold, that is, there is a relatively high correlation between the PPG signals at different times of any channel. In this case, the first condition is considered to be satisfied, and the PPG signals of the channel are added to a set and step S1024 is performed. Otherwise (autocorrelation coefficients of PPG signals of all the channels are less than or equal to the third threshold, that is, there is a relatively low correlation between the PPG signals at different times of all channels), the second condition is considered to be satisfied, and step S1025 is performed.

S1024: Perform time domain fusion on the PPG signals of the channels belonging to the set, and perform the FFT on the signal after the time domain fusion, to obtain the frequency domain signal of the fused PPG signal.

The performing time domain fusion on the PPG signals of the channels belonging to the set includes: averaging the PPG signals of the channels belonging to the set to obtain a time domain signal of the fused PPG signal, and performing the FFT on the time domain signal of the fused PPG signal to obtain a frequency domain signal of the fused PPG signal. Noise interference of the PPG signal is relatively small, and calculation workload can be reduced without reducing the accuracy through time domain fusion.

It should be noted that, Step S1024 does not depend on the foregoing steps S1021 to S1023, that is, step S1024 can be directly performed. If step S1024 is directly performed, the foregoing set includes the PPG signals of the plurality of channels obtained in step S101. That is, time domain fusion is performed on the PPG signals of the plurality of channels obtained in step S101 to obtain a frequency domain signal of the fused PPG signal.

S1025: Perform frequency domain fusion after performing a FFT on the PPG signals of the plurality of channels, to obtain a frequency domain signal of the fused PPG signal.

It should be noted that, step S1025 does not depend on the foregoing steps S1021 to S1023, that is, the step S1024 or the step S1025 can be directly selected and performed without performing condition judgment through the steps S1021 to S1023.

In a possible implementation, as shown in FIG. 18, step S1025 includes steps S10251 to S10254:

S10251: Obtain a frequency domain measurement value A corresponding to a value of a previous vital sign.

The value of the previous vital sign refers to a value of the vital sign obtained during a previous vital sign detection. The value of the previous life in the time domain can be mapped to a corresponding frequency domain, so a frequency domain measurement value corresponding to the value of the previous vital sign can be obtained by calculating the corresponding frequency domain measurement value according to the value of the previous vital sign. For example, as shown in FIG. 19, similar to point A in FIG. 4, assuming that the value of the previous heart rate is B, the frequency domain measurement value corresponding to the value B of the previous heart rate is A=B/60.

S10252: Perform the FIT on the PPG signals of the plurality of channels to obtain frequency domain signals of the PPG signals of the plurality of channels.

Figure 19:
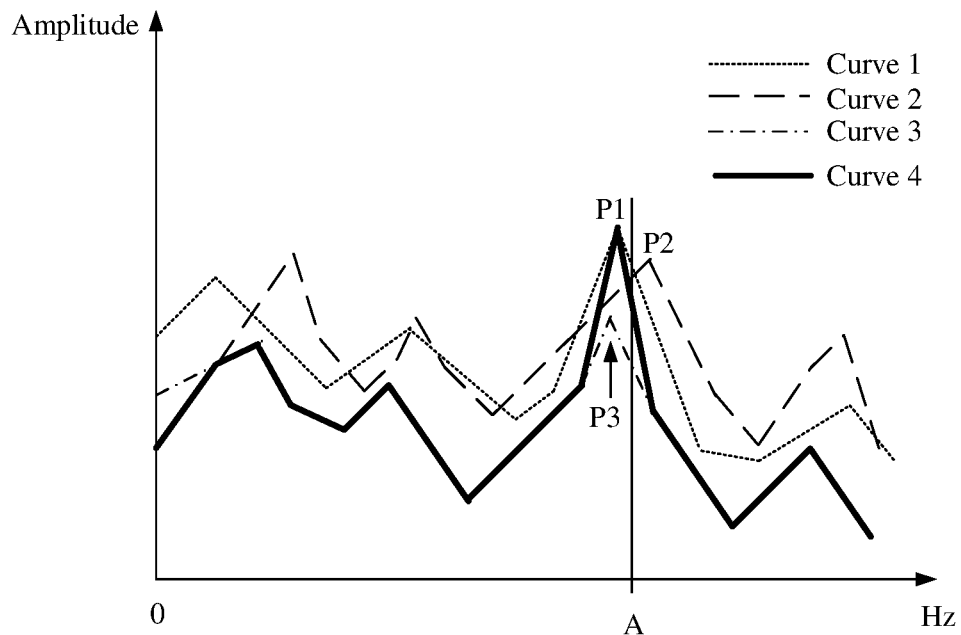
FIG. 19 is a schematic diagram of obtaining a frequency domain signal of a fused PPG signal according to a proximity peak according to an embodiment of this application.

For example, as shown in FIG. 19, assuming that there are PPG signals of three channels, curve 1 to curve 3 respectively represent frequency domain signals of the PPG signals of the three channels. There is no time sequence relationship between S10252 and S10251, and S10252 may be performed simultaneously with or before S10251.

S10253: Obtain a proximity peak in the frequency domain signals of the PPG signals for each channel.

The proximity peak refers to a peak value closest to the frequency domain measurement value A in the frequency domain signals of the PPG signals of the channel. For example, as shown in FIG. 19, the peak values closest to the frequency domain measurement value A in the curve 1 to the curve 3 are respectively P1, P2 and P3.

S10254: Select a maximum value of the proximity peaks in the frequency domain signals of the PPG signals of the plurality of channels, and for remaining values in the frequency domain signals of the PPG signals of the plurality of channels, select a minimum value at a same moment, to obtain the frequency domain signal of the fused PPG signal.

For example, as shown in FIG. 19, a value of P1 is the largest among the proximity peaks P1, P2 and P3. With reference to a minimum value of the remaining values in the frequency domain signals of the PPG signals of the three channels at a same moment, it can be obtained that curve 4 is the frequency domain signal of the fused PPG signal.

A change in the vital sign is relatively slow, and there is no large mutation. Therefore, in steps S10251 to S10253, by finding a proximity peak of the frequency domain measurement value corresponding to the value of the previous vital sign, a valid signal is filtered out. In step S10254, by determining the maximum value from the proximity peak, and then taking the minimum value of the remaining values, a maximum value of the valid signal is essentially selected, and other invalid signals (including noise interference) are suppressed, thereby improving a signal-to-noise ratio.

S103: Perform the FFT on the acceleration signal to obtain a frequency domain signal of the acceleration signal.

It should be noted that, there is no sequential execution order requirement for step S103 and step S102. For example, step S102 may be performed first and then step S103 may be performed, or, step S103 may be performed first and then step S102 may be performed, or, for a processor supporting multithreading or a processor having a plurality of cores, step S102 and step S103 may be simultaneously performed.

S104: Input the frequency domain signal of the fused PPG signal and the frequency domain signal of the acceleration signal into a deep neural network to obtain a value of a vital sign.

The application does not limit a specific form of the deep neural network, and mainly uses an anti-interference feature of the deep neural network to filter the noise interference in the PPG signal. In a possible implementation, the embodiments of this application use the deep sequence neural network described above.

Figure 20:
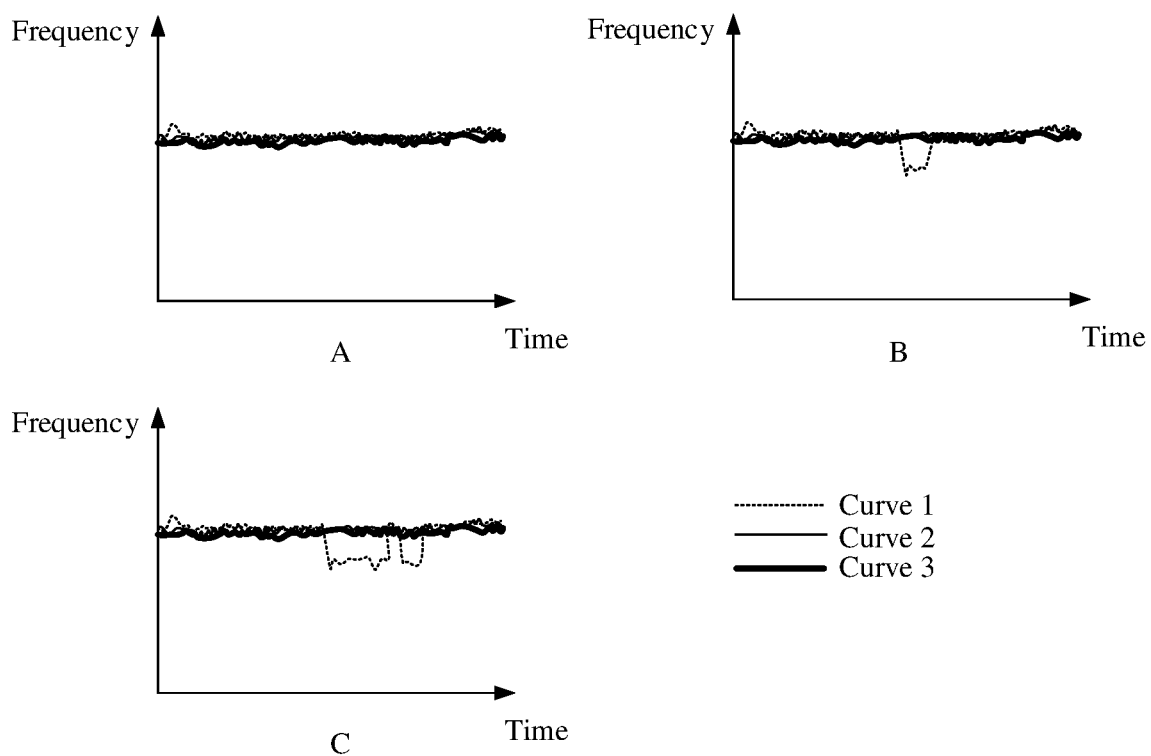
FIG. 20 is a schematic diagram of anti-interference of a deep sequence neural network according to an embodiment of this application.

For example, as shown in FIG. 20, curve 1 represents a signal that has not been processed by the deep sequence neural network, curve 2 represents a signal has been processed by the deep sequence neural network, and curve 3 represents a reference signal. A in FIG. 20 shows that when the noise interference is not large, both curve 1 and curve 2 can fit well with curve 3. B and C in FIG. 20 show that when the noise interference is large, curve 1 has a large distortion, while curve 2 can still fit well with curve 3. It can be seen that the anti-interference performance of the deep sequence neural network to the signal is better.

In the embodiments of this application, the frequency domain signal of the fused PPG signal and the frequency domain signal of the acceleration signal can be spliced into an eigenvector. The eigenvector is input into the deep sequence neural network as shown in FIG. 1, and a calculation result output by the deep sequence neural network is a value of a vital sign (for example, heart rate). The acceleration signal is used for removing motion noise in the PPG signal.

Since the change in the vital sign is relatively slow, and there is no large mutation, the recurrent network layer 13 in the deep sequence neural network realizes the accumulation of the time sequences of the eigenvectors. When interference suddenly occurs, the recurrent network layer 13 can effectively filter out the interference and improve the robustness of the system.

It should be noted that, when training the neural network, eigenvectors in each set of training data are eigenvectors formed by splicing the frequency domain signal of the PPG signal and the acceleration signal, and a calculation result in each set of training data is a value of a vital sign corresponding to the eigenvector. For a detailed training process, reference may be made to the foregoing description, which is not described herein again.

Figure 21:
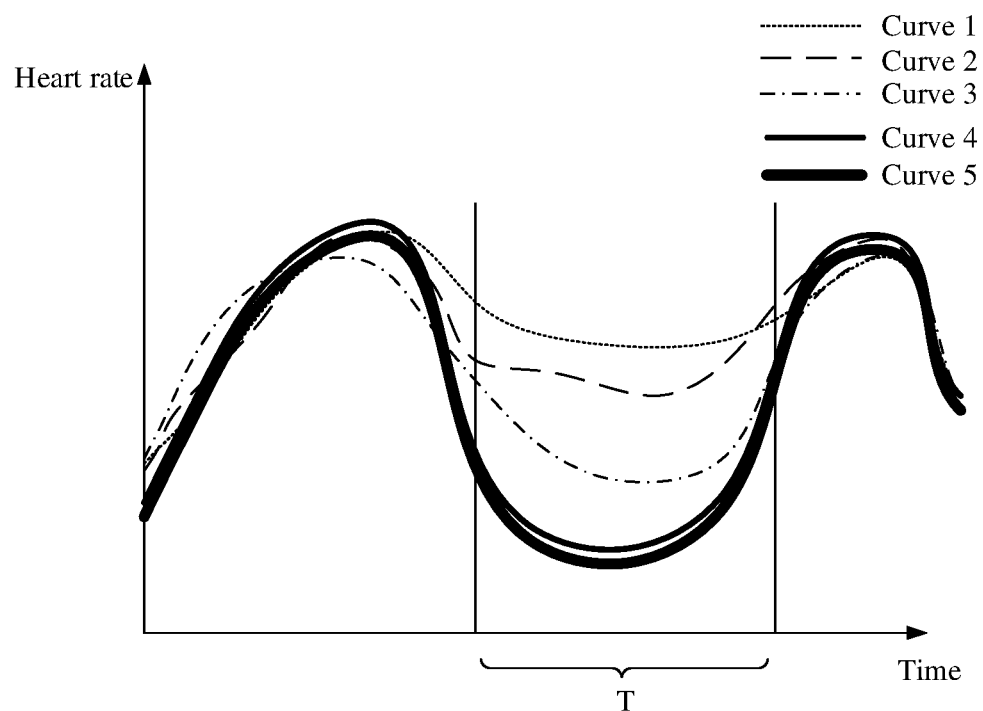
FIG. 21 is a schematic comparison diagram of heart rate obtained by a vital sign detection method according to an embodiment of this application.

For example, as shown in FIG. 21, curve 1 to curve 3 are heart rate values calculated by using PPG signals of three channels alone, curve 4 is a value of the heart rate obtained by using the vital sign detection method provided in the embodiments of this application, and curve 5 is a value of real heart rate. It can be seen from this that when there is serious interference in the time period T, the value of the heart rate calculated by using the PPG signals of the three channels alone is greatly distorted, while the value of the heart rate obtained by using the vital sign detection method provided in the embodiments does not have a large distortion.

S105: Display the value of the vital sign.

Figure 22:
FIG. 22 is a schematic diagram of displaying a vital sign according to an embodiment of this application.

For example, taking the vital sign as heart rate as an example, as shown in FIG. 22, the processor can control the display screen to display the value of the heart rate.

After applying the technical solutions provided in this application to an existing product, the accuracy of heart rate detection is significantly improved, with an average increase of about 2.5%. In addition, for a single scene, the accuracy of scenes with relatively great noise interference, such as a variable speed running on a treadmill, outdoor walking and an indoor elliptical machine, is significantly improved, especially in the indoor elliptical machine scene, the accuracy is increased by nearly 14%. That is, greater noise interference indicates more obvious improvement in accuracy.

The reason why the technical solution provided in this application can improve the accuracy of heart rate detection is that: on the one hand, the interference in the PPG signals is filtered by using a strong anti-interference feature of the deep neural network. On the other hand, when the noise interference is relatively large, the frequency domain fusion is performed on the PPG signals of the plurality of channels, to obtain a frequency domain signal of the fused PPG signal. Based on the value of the previous vital sign, the proximity peaks of the PPG signals of the channels are determined, the maximum value is determined from the proximity peaks, and the minimum value is determined from the remaining values, to obtain the frequency domain signal of the fused PPG signal, the maximum value of the valid signal is selected, and other invalid signals (including noise interference) are suppressed.

In the vital sign detection method and the electronic device provided in the embodiments of this application, an acceleration signal and PPG signals of a plurality of channels within a preset time period are obtained; time domain fusion is performed on the PPG signals of the plurality of channels to obtain a frequency domain signal of the fused PPG signal, or, frequency domain fusion is performed on the PPG signals of the plurality of channels, to obtain a frequency domain signal of the fused PPG signal; a fast Fourier transformation is performed on the acceleration signal to obtain a frequency domain signal of the acceleration signal; the frequency domain signal of the fused PPG signal and the frequency domain signal of the acceleration signal are input into a deep neural network to obtain a value of a vital sign; and the value of the vital sign is displayed. Interference in the PPG signal is filtered by using a strong anti-interference feature of the deep sequence neural network, to improve the accuracy of vital sign detection.

Figure 23:
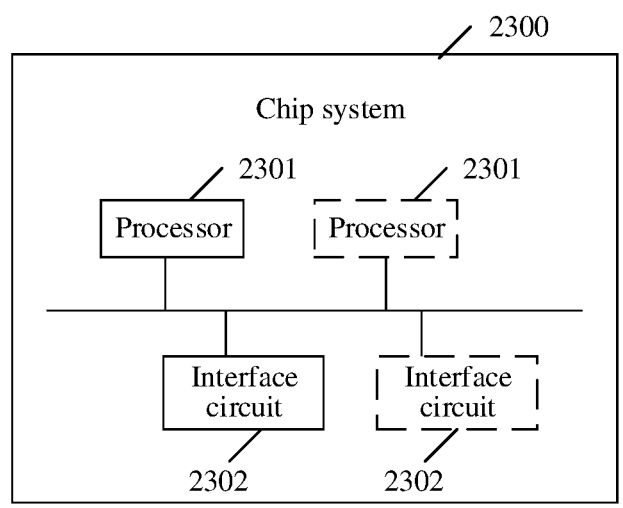
FIG. 23 is a schematic structural diagram of a chip system according to an embodiment of this application.

An embodiment of this application further provides a chip system. As shown in FIG. 23, the chip system 2300 includes at least one processor 2301 and at least one interface circuit 2302. The processor 2301 may be interconnected to the interface circuit 2302 by using a line. In an example, the interface circuit 2302 may be configured to receive a signal from another apparatus (for example, a memory of the electronic device). In another example, the interface circuit 2302 may be configured to transmit a signal to another apparatus (for example, the processor 2301). For example, the interface circuit 2302 may read the instructions stored in the memory and send the instructions to the processor 2301. The instructions, when executed by the processor 2301, may cause the electronic device to perform the steps in the foregoing embodiments, for example, perform the methods shown in FIG. 12, FIG. 16 and FIG. 18. Certainly, the chip system may further include other discrete devices. This is not specifically limited in the embodiments of this application.

An embodiment of this application further provides a computer-readable storage medium, including instructions, the instructions, when run on the electronic device, causes the electronic device to perform various functions or steps performed by the electronic device in the foregoing method embodiments, for example, perform the methods shown in FIG. 12, FIG. 16 and FIG. 18.

An embodiment of this application further provides a computer program product including instructions. The instructions, when run on an electronic device, cause the electronic device to perform various functions or steps performed by the electronic device in the foregoing method embodiments, for example, perform the methods shown in FIG. 12, FIG. 16 and FIG. 18.

It should be understood that sequence numbers of the foregoing processes do not mean execution sequences in various embodiments of this application. The execution sequences of the processes should be determined according to functions and internal logic of the processes, and should not constitute any limitation on the implementation processes of the embodiments of this application.

A person of ordinary skill in the art may be aware that, in combination with the examples described in the embodiments disclosed in this specification, modules and algorithm steps may be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the objective of convenient and brief description, for a detailed working process of the system, apparatus, and module described above, refer to a corresponding process in the method embodiments, and details are not described herein again.

In the several embodiments provided in this application, it should be understood that the disclosed system, device and method may be implemented in other manners. For example, the described device embodiments are merely examples. For example, division of the modules is merely logical function division and there may be other division manners during actual implementation. For example, a plurality of modules or components may be combined or integrated into another device, or some features may be ignored or not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate parts may or may not be physically separate, and parts displayed as modules may or may not be physical modules, may be located in one device, or may be distributed on a plurality of devices. Some or all of the modules may be selected according to actual requirements to implement the objectives of the solutions of the embodiments.

In addition, functional modules in the embodiments of this application may be integrated into one device, or each of the modules may exist alone physically, or two or more modules may be integrated into one device.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the processes or functions according to the embodiments of this application are produced. The computer may be a general-purpose computer, a dedicated computer, a computer network, or other programmable apparatuses. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (digital subscriber line, DSL)) or wireless (for example, infrared, wireless or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A vital sign detection method, comprising:
   obtaining an acceleration signal and photoplethysmographic (PPG) signals of a plurality of channels within a preset time period;
   calculating a correlation coefficient matrix among the PPG signals of the plurality of channels, wherein at least one correlation coefficient in the correlation coefficient matrix is less than or equal to a first threshold;
   calculating a variance of the PPG signals of each channel in the plurality of channels;
   determining that the variances of the PPG signals of all the channels are greater than or equal to a second threshold;
   performing frequency domain fusion after performing a fast Fourier transformation on the PPG signals of the plurality of channels, to obtain a frequency domain signal of a fused PPG signal;
   performing the fast Fourier transformation on the acceleration signal to obtain a frequency domain signal of the acceleration signal;
   inputting the frequency domain signal of the fused PPG signal and the frequency domain signal of the acceleration signal into a deep sequence neural network to obtain a value of a vital sign, wherein the vital sign comprises a heart rate, wherein inputting the frequency domain signal of the fused PPG signal and the frequency domain signal of the acceleration signal into the deep sequence neural network to obtain the value of the vital sign comprises:
   splicing the frequency domain signal of the fused PPG signal and the frequency domain signal of the acceleration signal into an eigenvector, and inputting the eigenvector to a first fully connected layer of the deep sequence neural network;
   outputting, by the first fully connected layer to a normalization layer, a non-linearized eigenvector to a normalization layer of the deep sequence neural network, wherein neurons in the first fully connected layer are fully connected to neurons in the normalization layer;
   normalizing, by the normalization layer, the non-linearized eigenvector, and outputting the normalized eigenvector to a recurrent network layer of the deep sequence neural network;
   accumulating, by the recurrent network layer, time sequences of normalized eigenvectors, and outputting the time sequences to a second fully connected layer of the deep sequence neural network, wherein neurons in the second fully connected layer are fully connected to neurons in the recurrent network layer; and
   outputting, by the second fully connected layer, the calculation result; and
   displaying the value of the vital sign.

2. The method according to claim 1, further comprising:
   adding the PPG signals of the plurality of channels to a set, wherein each correlation coefficient in the correlation coefficient matrix is greater than the first threshold; and
   performing time domain fusion on the PPG signals of the channels belonging to the set, and performing the fast Fourier transformation on a signal after the time domain fusion, to obtain the frequency domain signal of the fused PPG signal.

3. The method according to claim 1, further comprising:
   calculating autocorrelation coefficients of the PPG signals of channels whose variances are less than the second threshold, wherein at least one variance of the PPG signals of any channel is less than the second threshold.

4. The method according to claim 3, further comprising:
   performing time domain fusion on the PPG signals of the channels belonging to a set, and performing the fast Fourier transformation on the signal after the time domain fusion, to obtain the frequency domain signal of the fused PPG signal, wherein an autocorrelation coefficient of the PPG signals of any channel is greater than a third threshold.

5. The method according to claim 3, further comprising:
   performing frequency domain fusion after performing the fast Fourier transformation on the PPG signals of the plurality of channels, to obtain the frequency domain signal of the fused PPG signal, wherein autocorrelation coefficients of the PPG signals of all the channels are less than or equal to a third threshold.

6. The method according to claim 2, wherein the performing time domain fusion on the PPG signals of the channels belonging to the set comprises:
averaging the PPG signals of the channels belonging to the set.

7. The method according to claim 1, wherein the performing frequency domain fusion after performing a fast Fourier transformation on the PPG signals of the plurality of channels, to obtain a frequency domain signal of the fused PPG signal comprises:
obtaining a frequency domain measurement value corresponding to a value of a previous vital sign;
performing the fast Fourier transformation on the PPG signals of the plurality of channels to obtain frequency domain signals of the PPG signals of the plurality of channels;
obtaining a proximity peak in the frequency domain signals of the PPG signals for each channel, wherein the proximity peak refers to a peak value closest to the frequency domain measurement value in the frequency domain signals of the PPG signals of the each channel; and
selecting a maximum value of the proximity peaks in the frequency domain signals of the PPG signals of the plurality of channels, and for remaining values in the frequency domain signals of the PPG signals of the plurality of channels, selecting a minimum value at a same moment, to obtain the frequency domain signal of the fused PPG signal.

8. The method according to claim 1, further comprising:
increasing a quantity of the channels in response to a first operation; or
reducing the quantity of the channels in response to a second operation.

9. The method according to claim 1, wherein the deep sequence neural network further comprises a recurrent network layer for accumulating a time sequence of inputted eigenvectors.

10. An electronic device, comprising:
a processor, a memory, at least one light-emitting diode and a plurality of photo diodes; wherein
the light-emitting diode is configured to emit light to human tissue;
the plurality of photo diodes are configured to respectively receive the light reflected by the human tissue, and output photoplethysmographic (PPG) signals of a plurality of channels; and
the memory stores program instructions, and when the program instructions are executed by the processor, the electronic device is enabled to execute the following steps:
obtaining an acceleration signal and the PPG signals of the plurality of channels within a preset time period;
calculating a correlation coefficient matrix among the PPG signals of the plurality of channels, wherein at least one correlation coefficient in the correlation coefficient matrix less than or equal to a first threshold;
calculating a variance of the PPG signals of each channel in the plurality of channels;
determining that the variances of the PPG signals of all the channels are greater than or equal to a second threshold;
performing frequency domain fusion after performing a fast Fourier transformation on the PPG signals of the plurality of channels, to obtain a frequency domain signal of a fused PPG signal;
performing the fast Fourier transformation on the acceleration signal to obtain a frequency domain signal of the acceleration signal;
inputting the frequency domain signal of the fused PPG signal and the frequency domain signal of the acceleration signal into a deep sequence neural network to obtain a value of a vital sign, wherein the vital sign comprises a heart rate, wherein inputting the frequency domain signal of the fused PPG signal and the frequency domain signal of the acceleration signal into the deep sequence neural network to obtain the value of the vital sign comprises:
splicing the frequency domain signal of the fused PPG signal and the frequency domain signal of the acceleration signal into an eigenvector, and inputting the eigenvector to a first fully connected layer of the deep sequence neural network;
outputting, by the first fully connected layer to a normalization layer, a non-linearized eigenvector to a normalization layer of the deep sequence neural network, wherein neurons in the first fully connected layer are fully connected to neurons in the normalization layer;
normalizing, by the normalization layer, the non-linearized eigenvector, and outputting the normalized eigenvector to a recurrent network layer of the deep sequence neural network;
accumulating, by the recurrent network layer, time sequences of normalized eigenvectors, and outputting the time sequences to a second fully connected layer of the deep sequence neural network, wherein neurons in the second fully connected layer are fully connected to neurons in the recurrent network layer; and
outputting, by the second fully connected layer, the calculation result; and
displaying the value of the vital sign.

11. The electronic device according to claim 10, wherein a quantity of the photo diodes is 8, and a quantity of the light-emitting diodes is 2.

12. The electronic device according to claim 10, wherein the plurality of photo diodes are arranged in a ring shape around the light-emitting diodes in an area where the electronic device is in contact with the human tissue.

13. The electronic device according to claim 10, wherein the electronic device is enabled to further execute the following steps:
adding the PPG signals of the plurality of channels to a set, wherein each correlation coefficient in the correlation coefficient matrix is greater than the first threshold; and
performing time domain fusion on the PPG signals of the channels belonging to the set, and performing the fast Fourier transformation on a signal after the time domain fusion, to obtain the frequency domain signal of the fused PPG signal.

14. The electronic device according to claim 10, wherein the electronic device is enabled to further execute the following steps:
calculating autocorrelation coefficients of the PPG signals of channels whose variances are less than the second threshold, wherein a variance of the PPG signals of any channel is less than the second threshold.

15. The electronic device according to claim 14, wherein the electronic device is enabled to further execute the following steps:

performing time domain fusion on the PPG signals of the channels belonging to a set, and performing the fast Fourier transformation on the signal after the time domain fusion, to obtain the frequency domain signal of the fused PPG signal, wherein an autocorrelation coefficient of the PPG signals of any channel is greater than a third threshold.

16. The electronic device according to claim 14, wherein the electronic device is enabled to further execute the following steps:

performing frequency domain fusion after performing the fast Fourier transformation on the PPG signals of the plurality of channels, to obtain the frequency domain signal of the fused PPG signal, wherein autocorrelation coefficients of the PPG signals of all the channels are less than or equal to a third threshold.

17. The electronic device according to claim 13, wherein the performing time domain fusion on the PPG signals of the channels belonging to the set comprises:

averaging the PPG signals of the channels belonging to the set.

18. The electronic device according to claim 10, wherein the performing frequency domain fusion after performing a fast Fourier transformation on the PPG signals of the plurality of channels, to obtain a frequency domain signal of the fused PPG signal comprises:

obtaining a frequency domain measurement value corresponding to a value of a previous vital sign;

performing the fast Fourier transformation on the PPG signals of the plurality of channels to obtain frequency domain signals of the PPG signals of the plurality of channels;

obtaining a proximity peak in the frequency domain signals of the PPG signals for each channel, wherein the proximity peak refers to a peak value closest to the frequency domain measurement value in the frequency domain signals of the PPG signals of the each channel; and selecting a maximum value of the proximity peaks in the frequency domain signals of the PPG signals of the plurality of channels, and for remaining values in the frequency domain signals of the PPG signals of the plurality of channels, selecting a minimum value at a same moment, to obtain the frequency domain signal of the fused PPG signal.

19. The electronic device according to claim 10, wherein the deep neural network is a deep sequence neural network, and the deep sequence neural network comprises a recurrent network layer for accumulating a time sequence of inputted eigenvectors.

20. A non-transitory computer-readable storage medium, comprising instructions, the instructions, when executed on an electronic device, cause the electronic device to perform the following steps:

obtaining an acceleration signal and photoplethysmographic (PPG) signals of a plurality of channels within a preset time period;

calculating a correlation coefficient matrix among the PPG signals of the plurality of channels, wherein at least one correlation coefficient in the correlation coefficient matrix less than or equal to a first threshold;

calculating a variance of the PPG signals of each channel in the plurality of channels;

determining that that variances of the PPG signals of all the channels are greater than or equal to a second threshold, performing frequency domain fusion after performing a fast Fourier transformation on the PPG signals of the plurality of channels, to obtain a frequency domain signal of a fused PPG signal;

performing the fast Fourier transformation on the acceleration signal to obtain a frequency domain signal of the acceleration signal;

inputting the frequency domain signal of the fused PPG signal and the frequency domain signal of the acceleration signal into a deep sequence neural network to obtain a value of a vital sign, wherein the vital sign comprises heart rate, wherein inputting the frequency domain signal of the fused PPG signal and the frequency domain signal of the acceleration signal into the deep sequence neural network to obtain the value of the vital sign comprises:

splicing the frequency domain signal of the fused PPG signal and the frequency domain signal of the acceleration signal into an eigenvector, and inputting the eigenvector to a first fully connected layer of the deep sequence neural network;

outputting, by the first fully connected layer to a normalization layer, a non-linearized eigenvector to a normalization layer of the deep sequence neural network, wherein neurons in the first fully connected layer are fully connected to neurons in the normalization layer;

normalizing, by the normalization layer, the non-linearized eigenvector, and outputting the normalized eigenvector to a recurrent network layer of the deep sequence neural network;

accumulating, by the recurrent network layer, time sequences of normalized eigenvectors, and outputting the time sequences to a second fully connected layer of the deep sequence neural network, wherein neurons in the second fully connected layer are fully connected to neurons in the recurrent network layer; and outputting, by the second fully connected layer, the calculation result; and displaying the value of the vital sign.

* * * * *

UNITED STATES PATENT AND TRADEMARK OFFICE
CERTIFICATE OF CORRECTION

PATENT NO. : 12,465,226 B2
APPLICATION NO. : 18/007109
DATED : November 11, 2025
INVENTOR(S) : Zhang et al.

Page 1 of 1

It is certified that error appears in the above-identified patent and that said Letters Patent is hereby corrected as shown below:

In the Claims

In Column 23, in Claim 10, Line 59, after "matrix" insert -- is --.

Signed and Sealed this
Sixth Day of January, 2026

John A. Squires
*Director of the United States Patent and Trademark Office*